United States Patent
Tomikawa

[19]

[11] Patent Number: 6,072,266
[45] Date of Patent: *Jun. 6, 2000

[54] VIBRATION ACTUATOR

[75] Inventor: Yoshiro Tomikawa, Yonezawa, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/574,928

[22] Filed: Dec. 19, 1995

[30] Foreign Application Priority Data

Dec. 21, 1994 [JP] Japan .................................. 6-318150
Jun. 1, 1995 [JP] Japan .................................. 7-134895

[51] Int. Cl.[7] .................................................. H01L 41/08
[52] U.S. Cl. .................... 310/323.02; 310/317; 310/358; 310/323.16
[58] Field of Search .................................. 310/323, 328, 310/317, 358, 323.02, 323.16

[56] References Cited

U.S. PATENT DOCUMENTS

| | | | |
|---|---|---|---|
| 4,562,373 | 12/1985 | Tokusima et al. | 310/328 |
| 4,645,964 | 2/1987 | Hiramatsu et al. | 310/323 |
| 4,678,956 | 7/1987 | Izukawa et al. | 310/323 |
| 4,723,085 | 2/1988 | Mukohjima et al. | 310/328 |
| 4,788,468 | 11/1988 | Izukawa et al. | 310/323 |
| 4,829,209 | 5/1989 | Kawasaki et al. | 310/323 |
| 4,831,305 | 5/1989 | Mukohjima et al. | 310/323 |
| 4,983,874 | 1/1991 | Yamaguchi | 310/323 |
| 5,073,739 | 12/1991 | Iijima et al. | 310/323.02 |
| 5,105,117 | 4/1992 | Yamaguchi | 310/323.16 |
| 5,200,665 | 4/1993 | Iijima | 310/323.16 |
| 5,323,082 | 6/1994 | Wright | 310/328 |
| 5,416,375 | 5/1995 | Funakubo et al. | 310/323.16 |
| 5,453,653 | 9/1995 | Zumeris | 310/323.16 |

FOREIGN PATENT DOCUMENTS

| | | | |
|---|---|---|---|
| 0 536 832 | 9/1992 | European Pat. Off. . | |
| 0277477 | 11/1988 | Japan | 310/323.16 |

OTHER PUBLICATIONS

Ueha et al., "Ultrasonic Motors Theory and Applications," 1993, pp. 84–87.

*Ultrasonic Motors* by Ueha et al, Clarendon Press, Oxford, 1993 (pp 191–196).

*Primary Examiner*—Mark O. Budd
*Attorney, Agent, or Firm*—Vorys, Sater, Seymour and Pease LLP

[57] ABSTRACT

A vibration actuator has an elastic member formed into a ring shape, an electro-mechanical converting element joined to the elastic member, and a relative moving member which is in press contact with the elastic member. In the vibration actuator, the electro-mechanical converting element generates, upon application of a driving signal, a first vibration mode that vibrates in a direction parallel to a reference plane where the ring shape is formed, and a second vibration mode that vibrates in a direction perpendicular to or substantially perpendicular to the reference plane, and the relative moving member moves relative to the elastic member in one- or two-dimensional directions in the reference plane by the first and second vibration modes.

23 Claims, 29 Drawing Sheets

MOVING DIRECTIONS

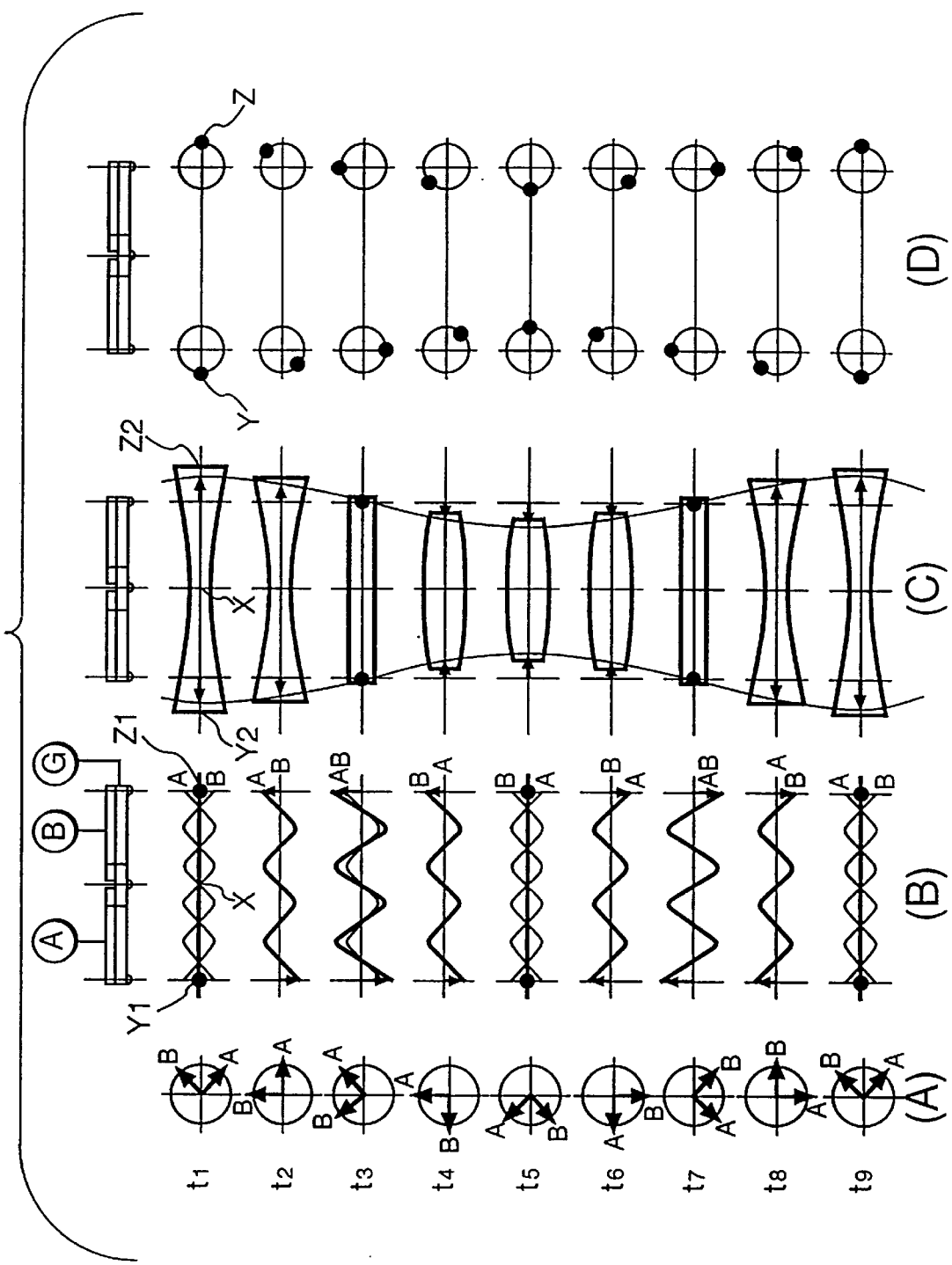

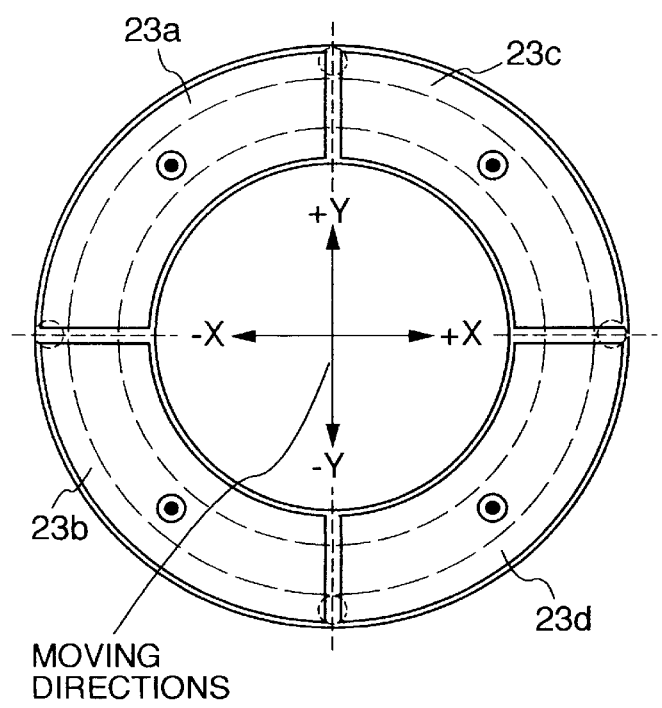
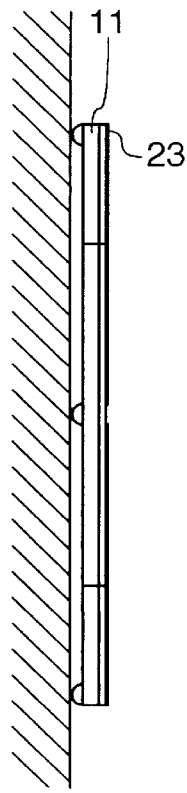

MOVING
DIRECTIONS

FIG. 17A
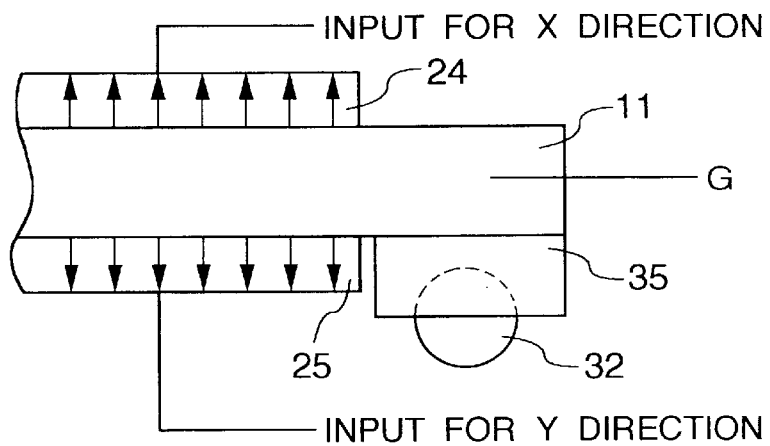
FIG. 17B
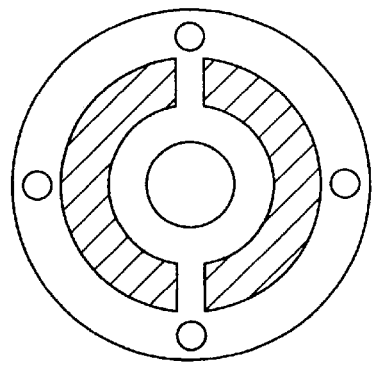
FIG. 17C
FIG. 17D
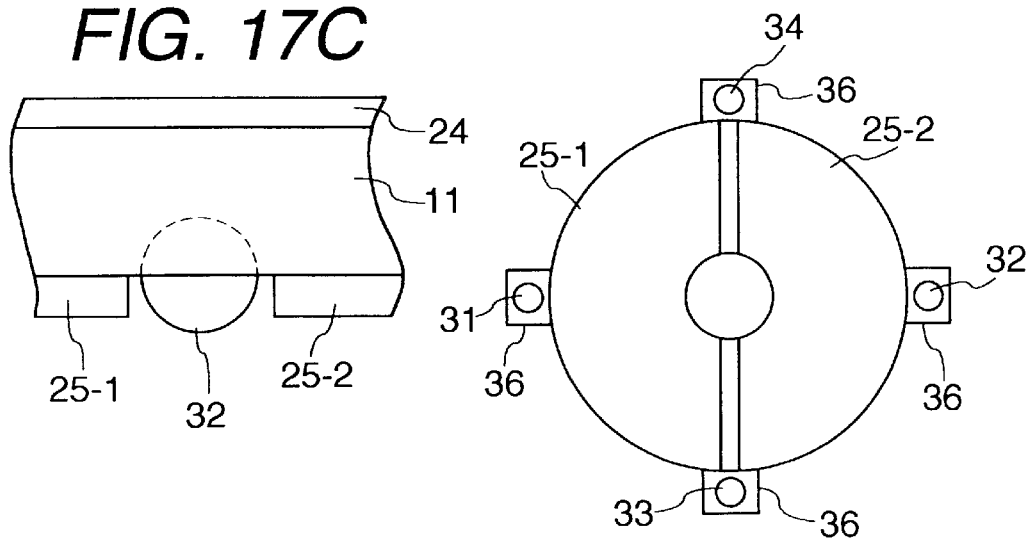

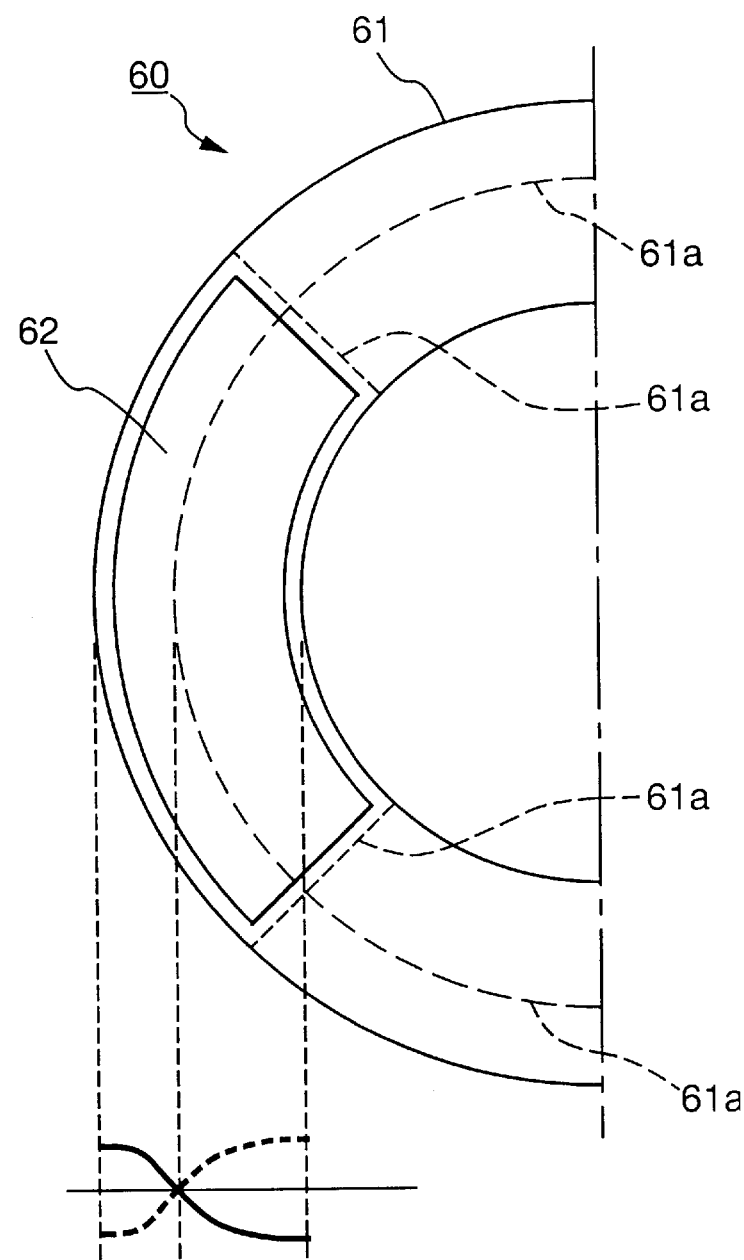
FIG. 24A
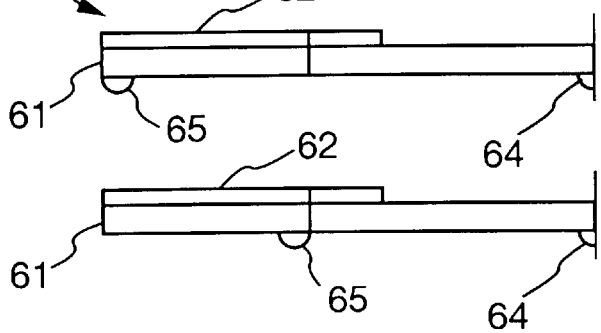
FIG. 24B
FIG. 24C (A) (B) (C) (D)

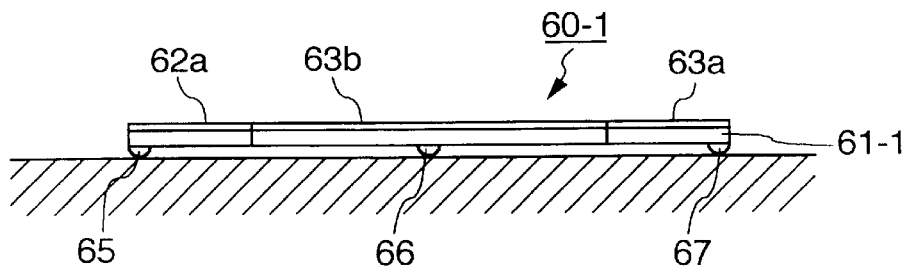
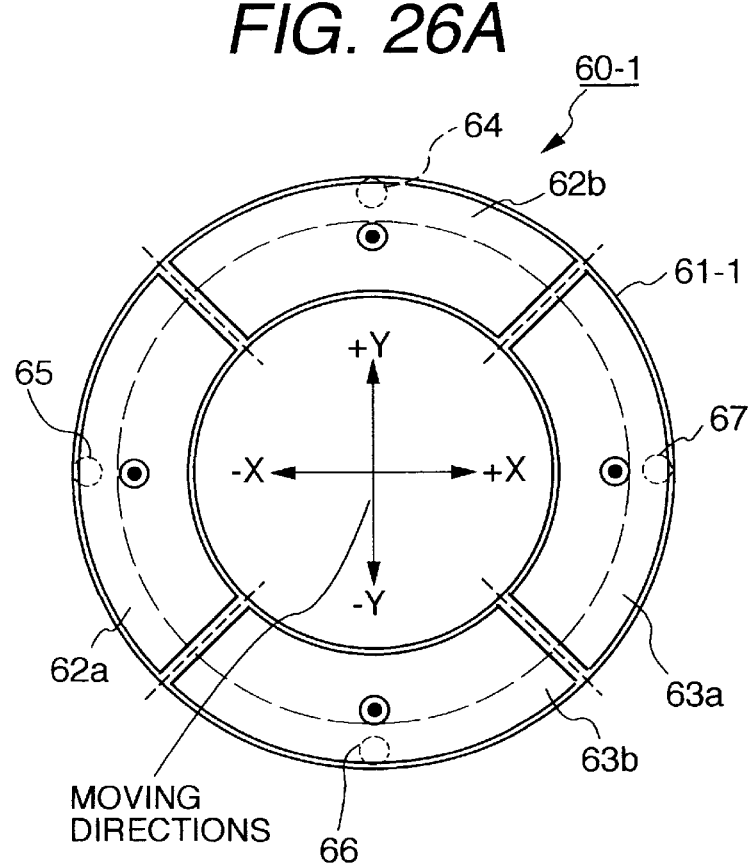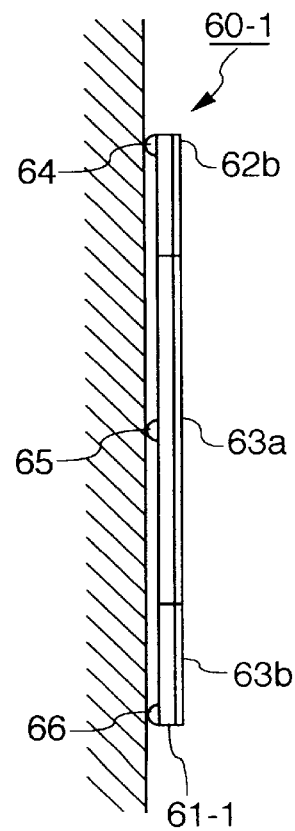

VIBRATION ACTUATOR

BACKGROUND OF THE INVENTION

1. Field of the Invention

The present invention relates to a vibration actuator and, more particularly, to a vibration actuator which utilizes degeneracy between an extensional vibration or non-axisymmetric vibration and a bending vibration.

2. Related Background Art

Conventionally, a first type of vibration actuator generates a travelling vibration wave in a ring-shaped elastic member by exciting electro-mechanical converting elements, thereby driving a movable member (rotor) as a relative moving member which is in press contact with the elastic member.

In a second type, i.e., a linear vibration actuator, a vibration applying electro-mechanical converting element is disposed on one end portion of a rod-shaped elastic member, and a vibration absorbing electro-mechanical converting element for absorbing reflection of a travelling wave is disposed on the other end portion. With this arrangement, a travelling wave that propagates from one end to the other end of the elastic member is generated, thereby driving a movable member which is in press contact with the elastic member.

The first type of vibration actuator is often assembled in, e.g., a lens barrel of a camera, and is used for driving an AF lens upon rotation of the movable member.

An image blur prevention device for correcting an image blur by moving a portion of a photographing optical system in a plane substantially perpendicular to the optical axis has been proposed. However, the first type of actuator cannot be applied to this device since its driving direction does not match. On the other hand, the second type of actuator cannot be easily assembled in a cylindrical lens barrel, and makes the device bulky to attain driving operations in two directions, i.e., the X- and Y-directions in the plane perpendicular to the optical axis.

When an electromagnetic motor, which has high-speed, low-torque features, is to be utilized, a gear train is normally required to assure a high output torque. Furthermore, when an object to be driven is to be moved in two directions in a plane, two, independent pairs of electromagnetic motors and gear trains are required to drive the object to be driven in the respective directions. For this reason, the device is made bulky and its weight increases. In addition, a decrease in response, generation of noise, and the like occur due to backlash or the like as an inevitable problem of the gear train.

SUMMARY OF THE INVENTION

It is an object of the present invention to provide a vibration actuator which allows either one- or two-dimensional movement in a plane, and can be easily assembled in a cylindrical portion such as a lens barrel.

In order to achieve the above object, according to the present invention, there is provided a vibration actuator comprising an elastic member formed in a ring shape, an electro-mechanical converting element joined to the elastic member, and a relative moving member which is in press contact with the elastic member.

When a driving signal is applied to the electro-mechanical converting element, the vibration actuator generates, in the elastic member, a first vibration mode that vibrates in a direction parallel to a reference plane where the ring shape is formed, and a second vibration mode that vibrates in a direction perpendicular to or substantially perpendicular to the reference plane, and the relative moving member is moved relative to the elastic member in one- or two-dimensional directions in the reference plane. The ratio between the outer and inner diameters of the elastic member is preferably set, so that the resonance frequency of the first vibration mode substantially matches that of the second vibration mode. The elastic member generates an elliptic motion by the first and second vibration modes.

The elastic member preferably comprises a driving force output member which is arranged at the generation position of the elliptic motion. Preferably, the driving force output member contacts the relative moving member and the contact portion is formed in a curved surface shape, or the driving force output member is joined to the surface of the electro-mechanical converting element via an insulating member.

Preferably, the first vibration mode is an extensional vibration, and the second vibration mode is a bending vibration. Alternatively, preferably, the first vibration mode is a non-axisymmetric vibration, and the second vibration mode is a bending vibration.

A plurality of electro-mechanical converting elements are preferably arranged on one surface of the elastic member, and are preferably grouped in correspondence with driving directions in which relative motions are performed.

The vibration actuator according to the present invention generates an extensional vibration or non-axisymmetric vibration and a bending vibration in the ring-shaped elastic member by exciting the electro-mechanical converting element, and degeneracy between the two vibrations generates an elliptic motion in a predetermined portion of the elastic member, thus moving the moving member in a planar direction.

The above and other objects, features and advantages of the present invention will be explained hereinafter and may be better understood by reference to the drawings and the descriptive matter which follows.

BRIEF DESCRIPTION OF THE DRAWINGS

FIG. 5 is a view for explaining the operation of the first embodiment;

FIGS. 12A to 12C are views showing the layout of the piezoelectric element of the third embodiment;

FIGS. 17A to 17D are views showing the layout of the driving force output members of the fourth embodiment;

FIGS. 24A to 24C are views for explaining the elastic member of the eighth embodiment;

FIG. 26A is a plan view showing the overall arrangement of a ninth embodiment of a vibration actuator according to the present invention;

FIGS. 26B and 26C are side views showing the overall arrangement of the ninth embodiment;

DETAILED DESCRIPTION OF THE PREFERRED EMBODIMENTS (First Embodiment)

FIGS. 1A to 5 show the first embodiment of a vibration actuator according to the present invention.

The vibration actuator is constituted by an elastic member 11, two piezoelectric elements (electro-mechanical converting elements) 21 and 22 joined to the upper surface of the elastic member 11, four driving force output members 31 to 34 formed on the lower surface of the elastic member 11, and the like.

Figure 2:
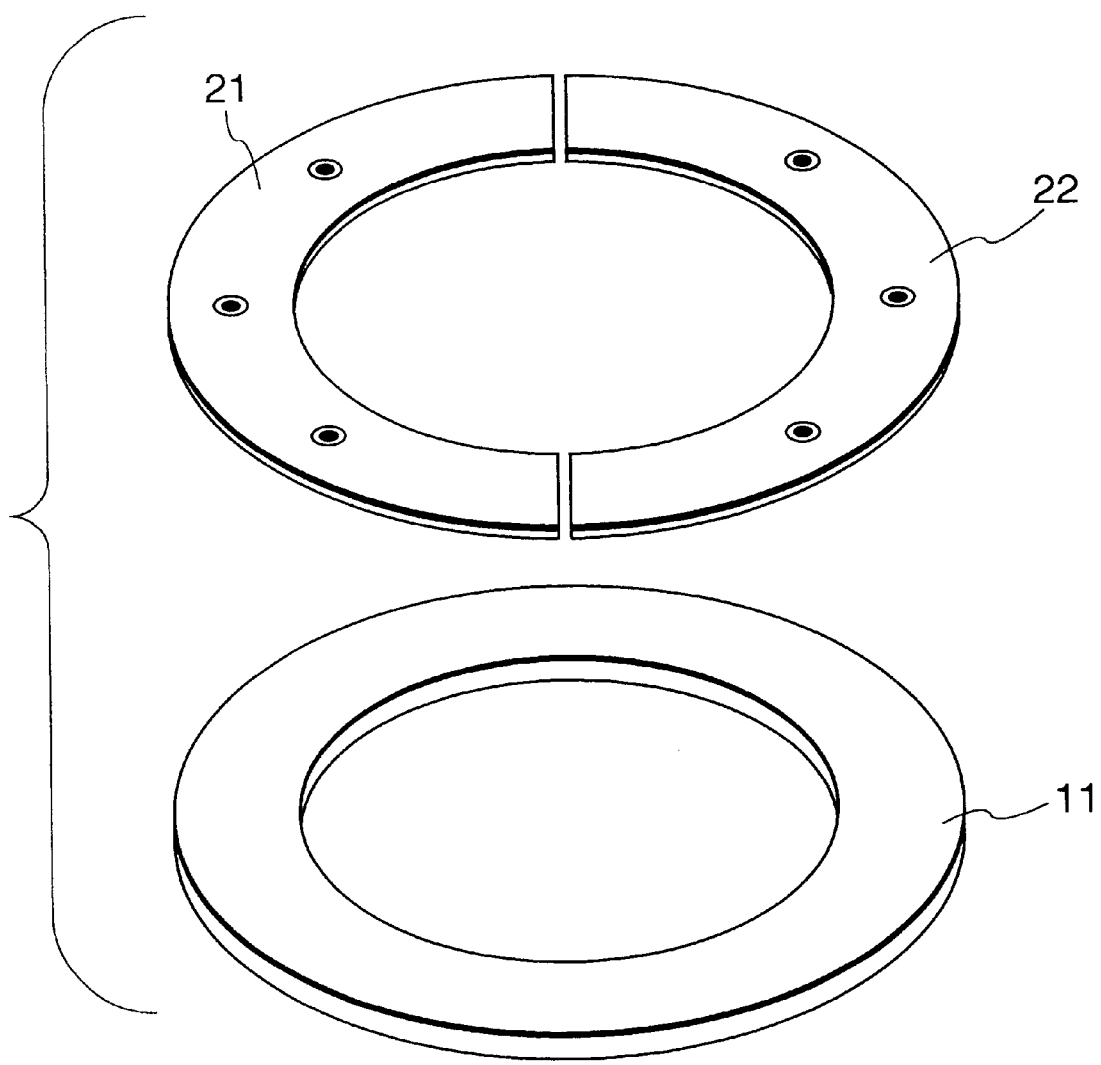
FIG. 2 is a perspective view showing an elastic member and a piezoelectric element of the first embodiment.

As shown in FIG. 2, the elastic member 11 is a disk-like elastic member with a central hole or a ring-shaped elastic member, and consists of a metal, plastic, or the like.

As will be described below with reference to FIG. 3, the elastic member 11 can match an extensional vibration ((R-1) mode: an extensional vibration in a planar direction) with a 2nd-order bending vibration ($B_{21}$ mode) by setting the dimensions of its ring shape. In this embodiment, this matching is realized by adjusting the diameter of the inner hole of the ring shape.

Figure 3:
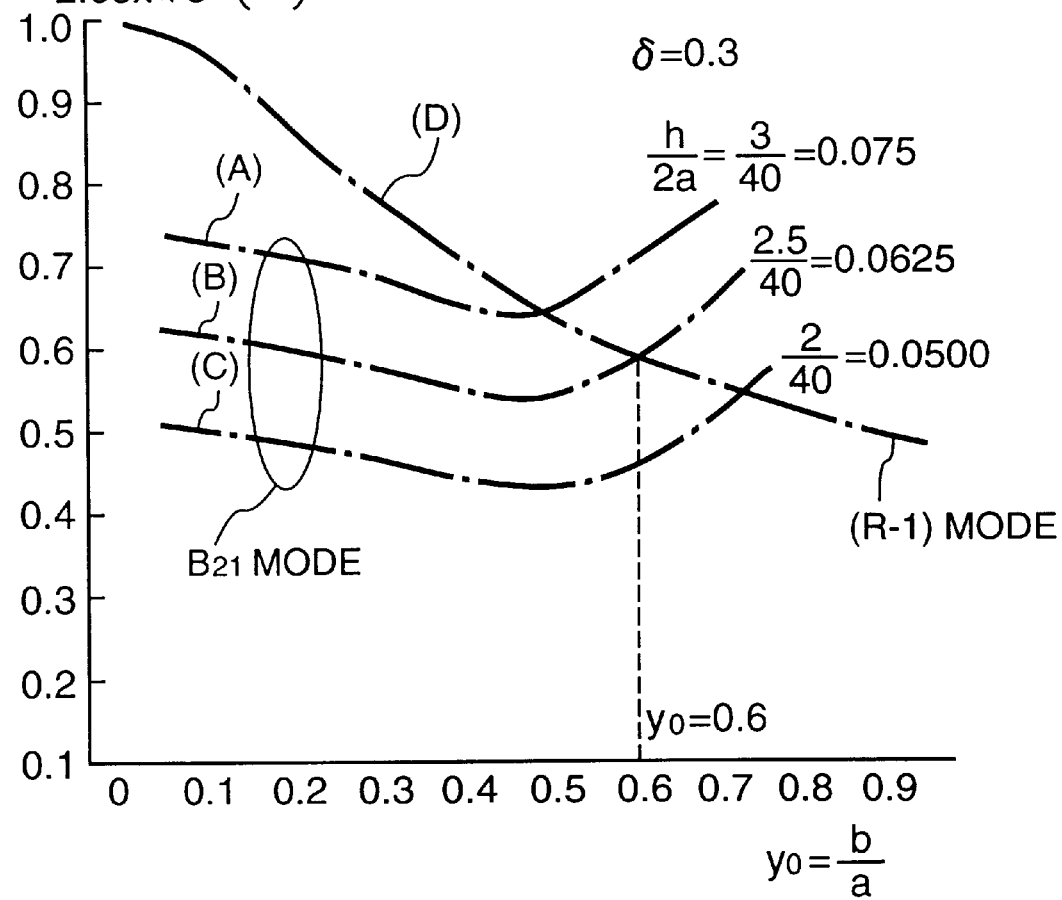
FIG. 3 is a graph for explaining the elastic member of the first embodiment.

The abscissa of FIG. 3 represents the ratio y=b/a of an outer diameter 2a and an inner diameter 2b (see FIG. 1A) of the ring shape. At the position "0", no hole is formed, and the hole diameter increases as the ratio becomes closer to 1.

The ordinate represents the ratio of the resonance frequency, $\omega_{00}$, of the (R-1) mode to the resonance frequency, $\omega_{21}$, of the $B_{21}$ mode, i.e., $\omega_{21}/\omega_{00}=\{\alpha_{21}^2/[2.05\cdot(3)^{1/3}]\}\cdot(h/2a)$.

A curve (D) in FIG. 3 represents the (R-1) mode, and curves (A), (B), and (C) represent the cases of the $B_{21}$ mode in correspondence with values 3/40, 2.5/40, and 2/40 of h (the thickness of the ring)/2a.

As can be seen from FIG. 3, degeneracy is attained near y=0.6 when the thickness h=2.5 mm and the outer diameter 2a=40 mm.

Figure 1A:
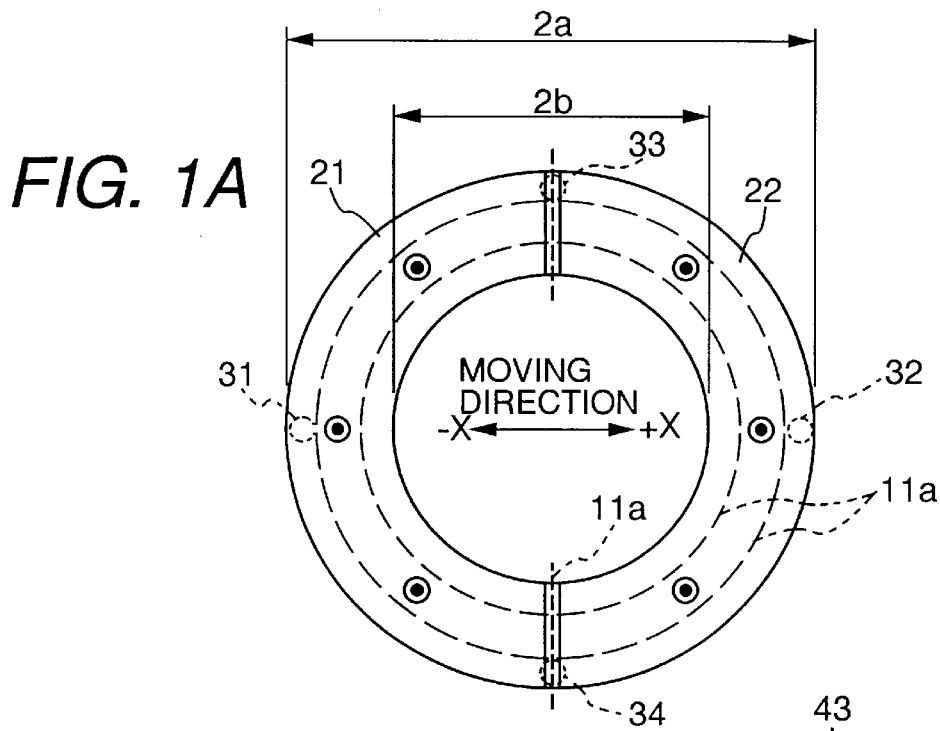
FIG. 1A is a plan view showing the overall arrangement of a first embodiment of a vibration actuator according to the present invention.
Figure 4A:
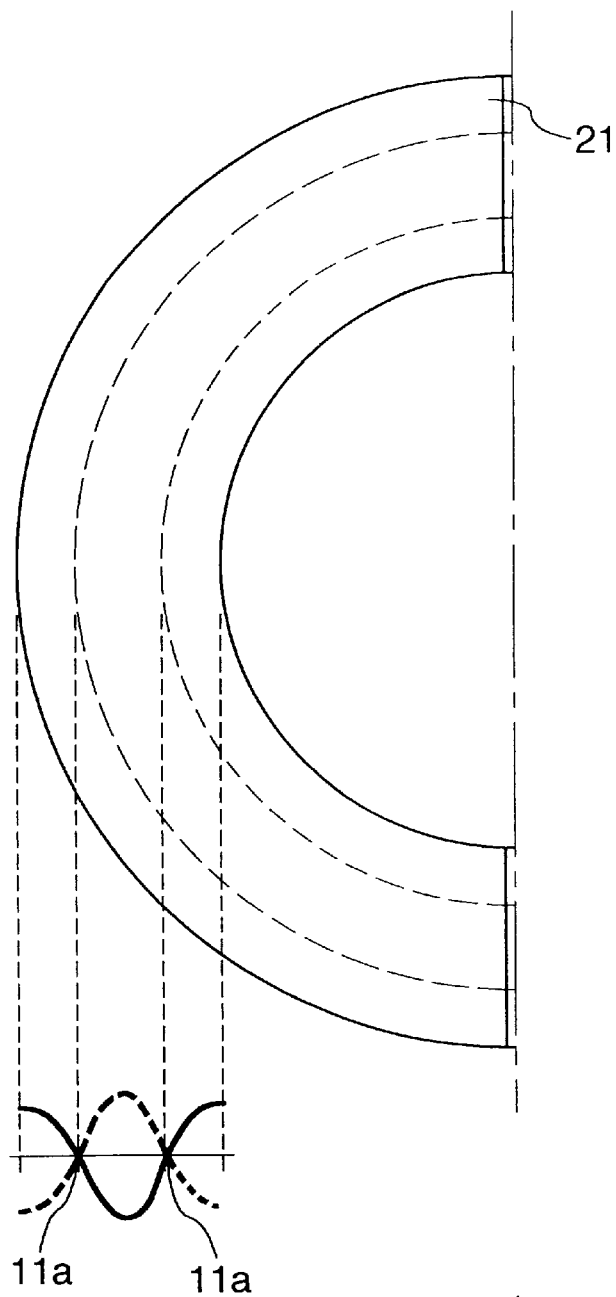
FIGS. 4A to 4D are views for explaining the driving force output member in the first embodiment.
Figure 4B:
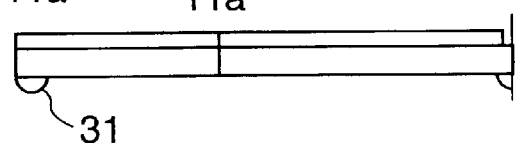
Figure 4C:
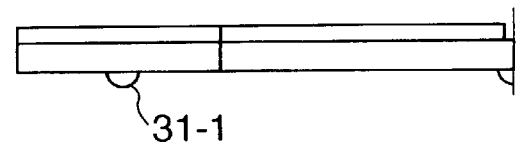
Figure 4D:
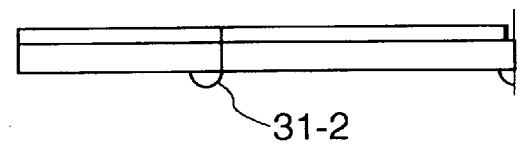

In this embodiment, degeneracy between the (R-1) mode and the $B_{21}$ mode (second-order bending mode) is exemplified, and nodes 11a in an (R-1)-$B_{21}$ mode are shown in FIGS. 1A and 4A.

As shown in FIG. 2, each of the piezoelectric elements 21 and 22 has a half ring shape, and consists of, e.g., PZT. The piezoelectric elements 21 and 22 are polarized, as shown in FIGS. 1A and 1C, and are supplied with two-phase input voltages A and B.

The driving force output members 31 to 34 are portions for picking up an elliptic motion generated by a synthesized vibration of the bending and extensional vibrations of the elastic member 1, and move relative to a fixed member 51 (relative moving member) while contacting it. As shown in FIG. 1A, the driving force output members 31 to 34 are arranged at 90° angular intervals on four outer edge positions of the lower surface of the elastic member 11. Spheres consisting of, e.g., silicon nitride are attached to the driving force output members 31 to 34 to improve their wear resistance.

These driving force output members 31 to 34 are preferably arranged at positions other than the node positions of a longitudinal vibration so as to efficiently pick up a driving force. Like driving force output members 31, 31-1, and 31-2 respectively shown in FIGS. 4A to 4D, each driving force output member is preferably present at an antinode position of a vertical vibration in a direction substantially perpendicular to the moving plane.

Figure 1B:
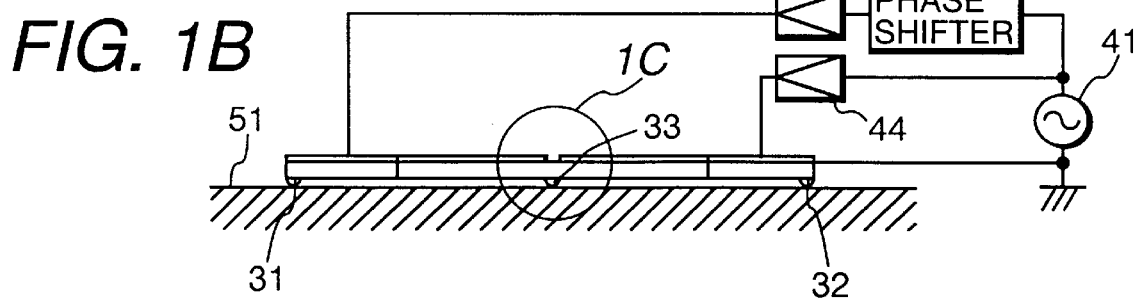
FIG. 1B is a side view showing the overall arrangement of the first embodiment.
Figure 1C:
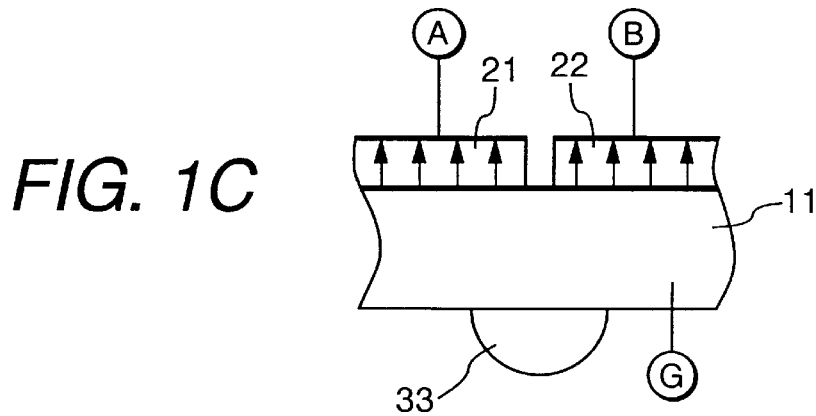
FIG. 1C is a view showing the layout of driving force output members in the first embodiment.

As shown in FIG. 1C, the vibration actuator generates a composite vibration of the bending and extensional vibrations by applying high-frequency voltages A and B to the two piezoelectric elements 21 and 22, thereby generating elliptic motions at the distal ends of the driving force output members 31 and 32 so as to generate a driving force. In FIG. 1C, G represents ground. The two piezoelectric elements 21 and 22 are polarized in the same direction, and the high-frequency voltages A and B have a time phase difference of $\pi/2$ therebetween. Note that the two piezoelectric elements 21 and 22 may be polarized in opposite directions (see FIG. 6).

As shown in FIG. 1B, an oscillator 41 is used for oscillating a high-frequency signal. The output from the oscillator 41 is divided into two outputs, so that one output is converted into a signal having a time phase difference of $\pi/2$ by a phase shifter 42 and is then connected to an amplifier 43, and the other output is directly connected to an amplifier 44. The outputs from the amplifiers 43 and 44 are respectively connected to the piezoelectric elements 21 and 22 as the high-frequency voltages A and B.

Column (A) in FIG. 5 represents changes, over time, in two-phase high-frequency voltages A and B input to the vibration actuator at times t1 to t9. The abscissa represents the effective value of the high-frequency voltage. Column (B) in FIG. 5 shows the deformation states of the section of the vibration actuator, i.e., shows a change, over time (t1 to t9), in bending vibration generated in the vibration actuator. Column (C) in FIG. 5 shows the deformation states of the section of the vibration actuator, i.e., shows a change, over time (t1 to t9), in extensional vibration generated in the vibration actuator. Column (D) in FIG. 5 shows a change, over time (t1 to t9), in elliptic motion generated in the driving force output members 31 and 32 of the vibration actuator.

The operation of the vibration actuator of this embodiment will be described below along the change over time (t1 to t9).

At time t1, as shown in column (A) in FIG. 5, the high-frequency voltage A generates a positive voltage, and the high-frequency voltage B similarly generates a positive voltage having the same magnitude as that generated by the voltage A. As shown in column (B) in FIG. 5, bending motions generated by the high-frequency voltages A and B cancel each other, and mass points Y1 and Z1 have an amplitude=0. As shown in column (C) in FIG. 5, extensional vibrations by the high-frequency voltages A and B are generated in the extending direction. Mass points Y2 and Z2 exhibit maximum extension amounts to have a node X as the center, as indicated by arrows. As a result, as shown in column (D) in FIG. 5, the two vibrations are synthesized, the synthesis of the motions of the mass points Y1 and Y2 generates the motion of a mass point Y, and the synthesis of the motions of the mass points Z1 and Z2 generates the motion of a mass point Z.

At time t2, as shown in column (A) in FIG. 5, the high-frequency voltage B becomes zero, and the high-frequency voltage A generates a positive voltage. As shown in column (B) in FIG. 5, a bending vibration by the high-frequency voltage A is generated, the mass point Y1 moves in the negative direction, and the mass point Z1 in the positive direction. As shown in column (C) in FIG. 5, an extensional vibration by the high-frequency voltage A is generated, and the mass points Y2 and Z2 contract as compared to their amplitudes at time t1. As a result, as shown in column (D) in FIG. 5, the two vibrations are synthesized, and the mass points Y and Z move counterclockwise from their positions at time t1.

At time t3, as shown in column (A) in FIG. 5, the high-frequency voltage A generates a positive voltage, and the high-frequency voltage B similarly generates a negative voltage having the same magnitude as that generated by the voltage A. As shown in column (B) in FIG. 5, the bending motions by the high-frequency voltages A and B are synthesized and amplified, and the movement of the mass point Y1 is amplified in the negative direction as compared to its amplitude at time t2 and exhibits a maximum negative amplitude value. The movement of the mass point Z1 is amplified in the positive direction as compared to its amplitude at time t2 and exhibits a maximum positive amplitude value. As shown in column (C) in FIG. 5, the extensional vibrations by the high-frequency voltages A and B cancel each other, and the mass points Y2 and Z2 return to their original positions. As a result, as shown in column (D) in FIG. 5, the two vibrations are synthesized, and the mass points Y and Z move counterclockwise from their positions at time t2.

At time t4, as shown in column (A) in FIG. 5, the high-frequency voltage A becomes zero, and the high-frequency voltage B generates a negative voltage. As shown in column (B) in FIG. 5, a bending motion by the high-frequency voltage B is generated, the amplitude of the mass point Y1 becomes smaller than that at time t3, and the amplitude of the mass point Z1 becomes smaller than that at time t3. As shown in column (C) in FIG. 5, an extensional vibration by the high-frequency voltage B is generated, and the mass points Y2 and Z2 contract. As a result, as shown in column (D) in FIG. 5, the two vibrations are synthesized, and the mass points Y and Z move counterclockwise from their positions at time t3.

At time t5, as shown in column (A) in FIG. 5, the high-frequency voltage A generates a negative voltage, and the high-frequency voltage B similarly generates a negative voltage having the same magnitude as that generated by the voltage A. As shown in column (B) in FIG. 5, bending motions by the high-frequency voltages A and B cancel each other, and the mass points Y1 and Z1 have an amplitude=0. As shown in column (C) in FIG. 5, extensional vibrations by the high-frequency voltages A and B are generated in the contracting direction. The mass points Y2 and Z2 exhibit maximum contraction amounts to have the node X as the center, as indicated by arrows. As a result, as shown in column (D) in FIG. 5, the two vibrations are synthesized, and the mass points Y and Z move counterclockwise from their positions at time t4.

As time elapses from t6 to t9, the bending and extensional vibrations are generated in the same manner as in the above-mentioned principle. As a result, as shown in column (D) in FIG. 5, the mass points Y and Z move counterclockwise, i.e., make elliptic motions.

With the above-mentioned principle, the vibration actuator generates elliptic motions at the distal ends of the driving force output members 31 and 32, thereby generating a driving force. Therefore, when the distal ends of the driving force output members 31 and 32 are brought into press contact with the fixed member 51, the elastic member 11 moves by itself relative to the fixed member 51.

Figure 6:
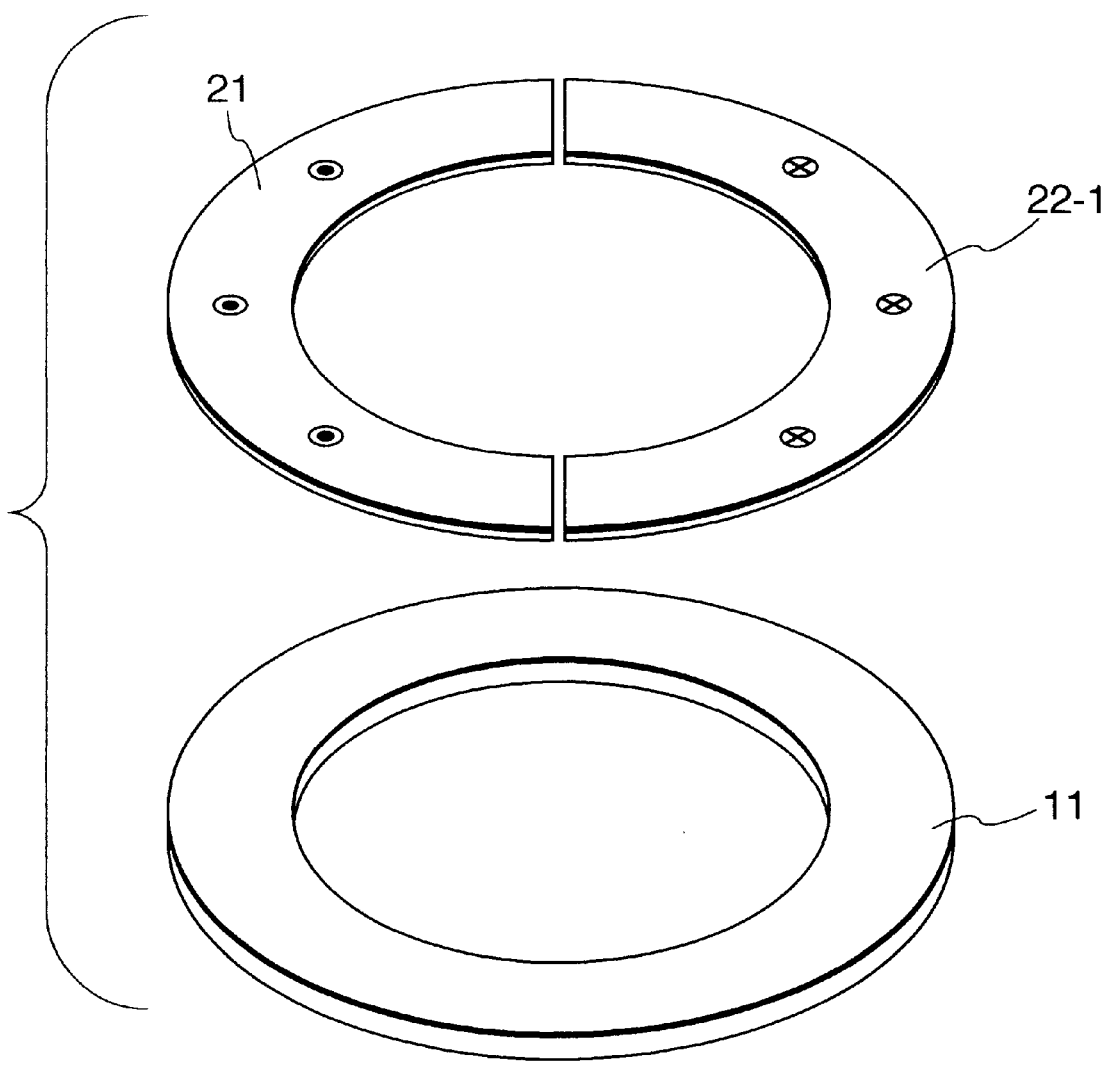
FIG. 6 is a perspective view showing a modification of the elastic member and the piezoelectric element of the first embodiment.

FIG. 6 shows a modification of the piezoelectric elements of the vibration actuator according to the first embodiment.

In FIG. 2, the piezoelectric elements 21 and 22 are polarized in the same direction (upward direction). In the modification shown in FIG. 6, the piezoelectric elements are polarized in different directions, i.e., the piezoelectric element 21 is polarized in the upward direction, and a piezoelectric element 22-1 is polarized in a downward direction.

In this case, the piezoelectric element 22-1 shown in FIG. 6 can be supplied with a driving signal whose sign is inverted from that to be applied to the piezoelectric element 22 shown in FIG. 2.

(Second Embodiment)

FIGS. 7A to 9 show the second embodiment of a vibration actuator according to the present invention.

In the embodiments to be described hereinafter, the same reference numerals denote portions having the same functions as those in the first embodiment described above, and a repetitive description thereof will be avoided.

In the second embodiment, a piezoelectric element 20 is obtained by separately adhering two electrode plates 20a and 20b to a single piezoelectric material. With this arrangement, two piezoelectric elements need not be aligned, thus allowing easy manufacture. More specifically, since adhesion and alignment of the piezoelectric element are easy, adhesion precision between the elastic member 11 and the piezoelectric element 20 can be improved, and excitation nonuniformity caused by a deviation of the adhered position of the piezoelectric element can be eliminated. In addition, any right/left difference (the difference between moving speeds in +x- and -x-directions) depending on the moving directions can also be eliminated.

Figure 9:
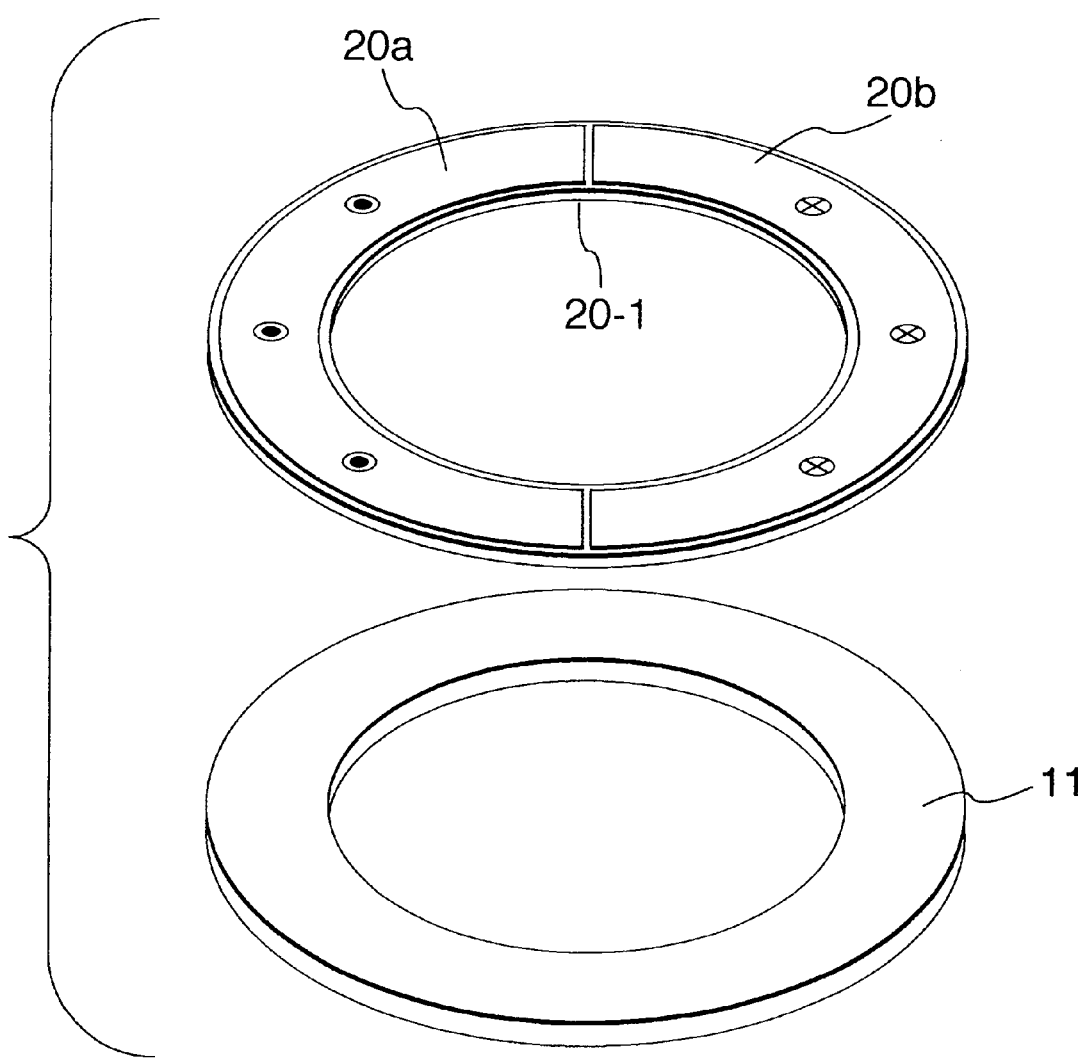
FIG. 9 is a perspective view showing a modification of the elastic member and the piezoelectric element of the second embodiment.

In a modification shown in FIG. 9, portions, corresponding to the two electrode plates 20a and 20b, of the piezoelectric material are polarized in different directions.

(Third Embodiment)

FIGS. 10A to 13 show the third embodiment of a vibration actuator according to the present invention.

The first and second embodiments have exemplified a structure that allows only a one-dimensional movement (in the X-direction). However, the third embodiment allows a two-dimensional movement (in the X- and Y-directions).

Figure 10B:
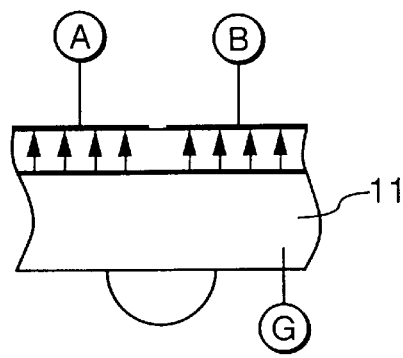
FIG. 10B is a view showing the layout of driving force output members in the third embodiment.
Figure 11:
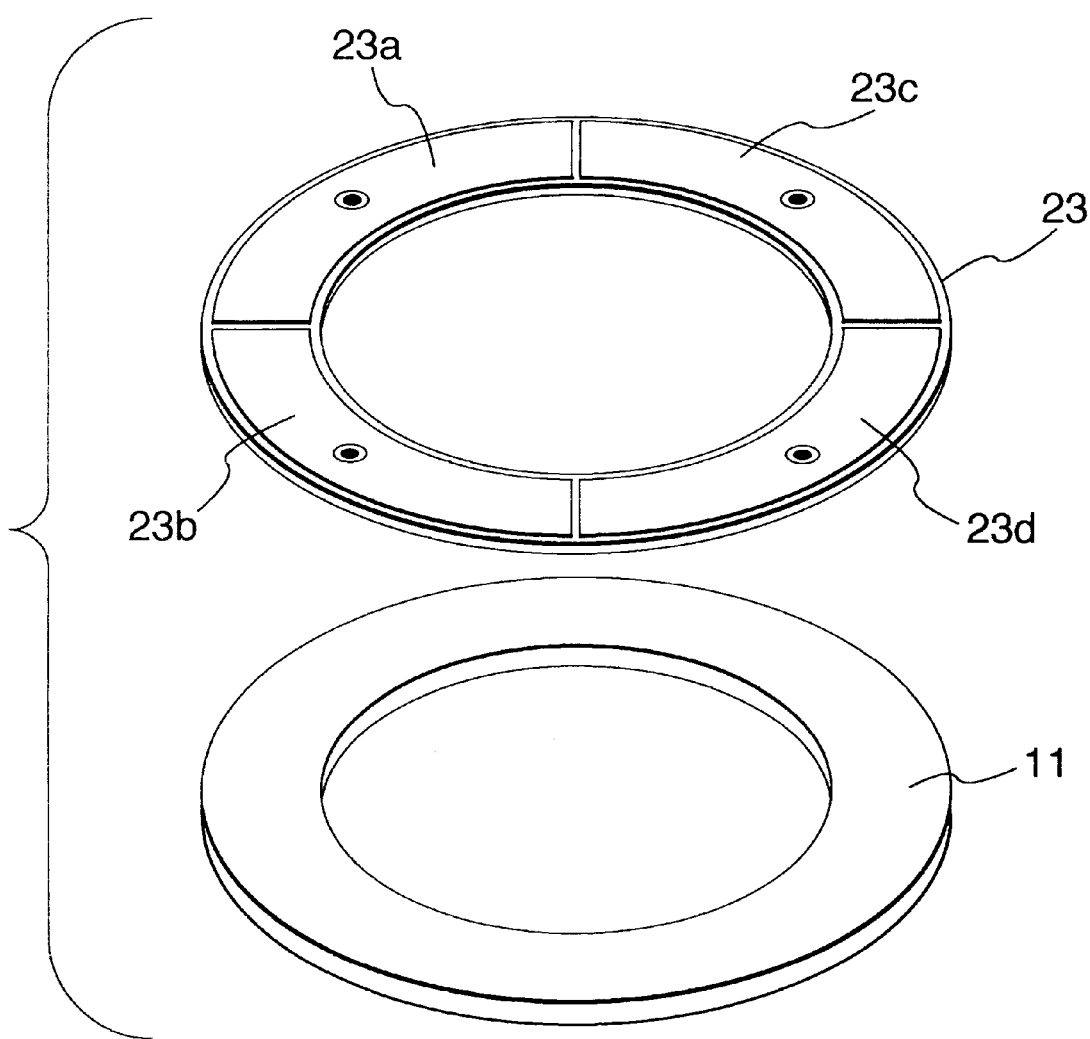
FIG. 11 is a perspective view showing an elastic member and a piezoelectric element of the third embodiment.

A piezoelectric material of a piezoelectric element 23 is polarized in one direction (see FIG. 10B), and the element 23 is divided into four electrode plates 23a, 23b, 23c, and 23d, as shown in FIGS. 11 and 12A.

Figure 10A:
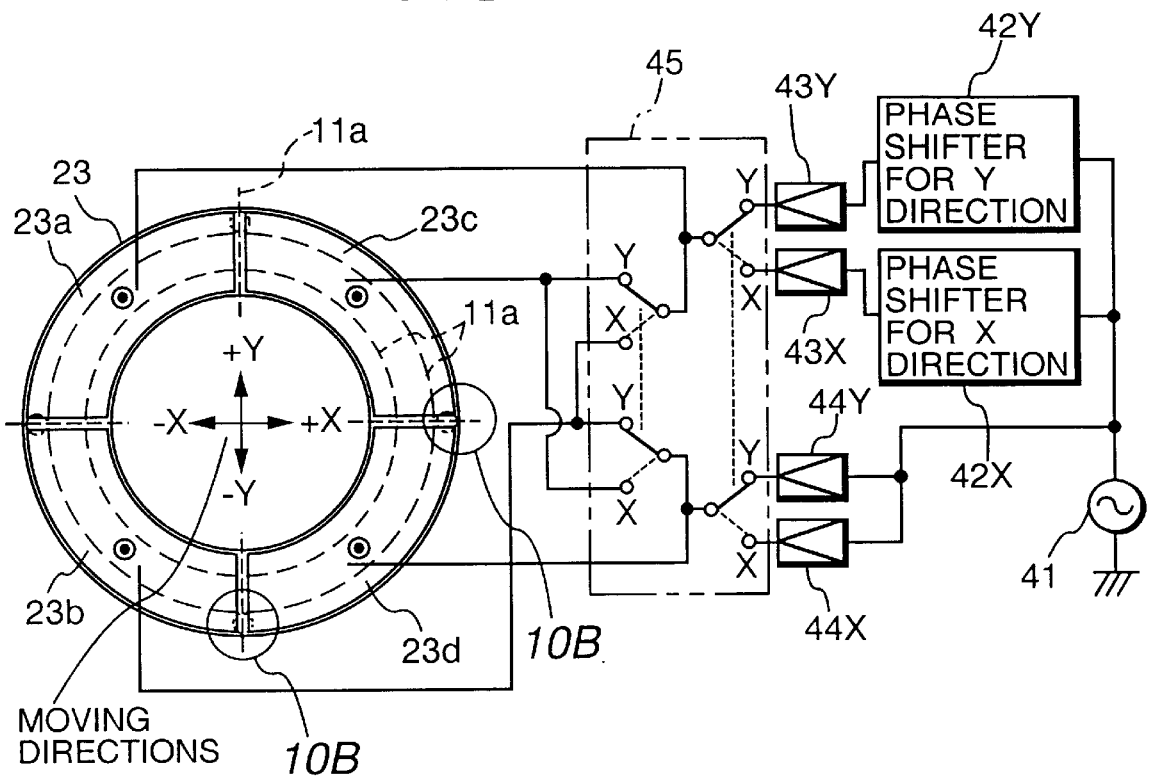
FIG. 10A is a plan view showing the overall arrangement of a third embodiment of a vibration actuator according to the present invention.

In a driving circuit, as shown in FIG. 10A, a high-frequency signal from the oscillator 41 is divided into two outputs, so that one output is temporally phase-shifted by π/2 by phase shifters 42X and 42Y for the X- and Y-directions, and the outputs from the phase shifters are connected to amplifiers 43X and 43Y for the X- and Y-directions. On the other hand, the other output is directly connected to amplifiers 44X and 44Y for the X- and Y-directions.

The amplifiers 43X, 43Y, 44X, and 44Y are connected to the electrode plates 23a, 23b, 23c, and 23d of the piezoelectric element via a selection switch 45.

Figure 7A:
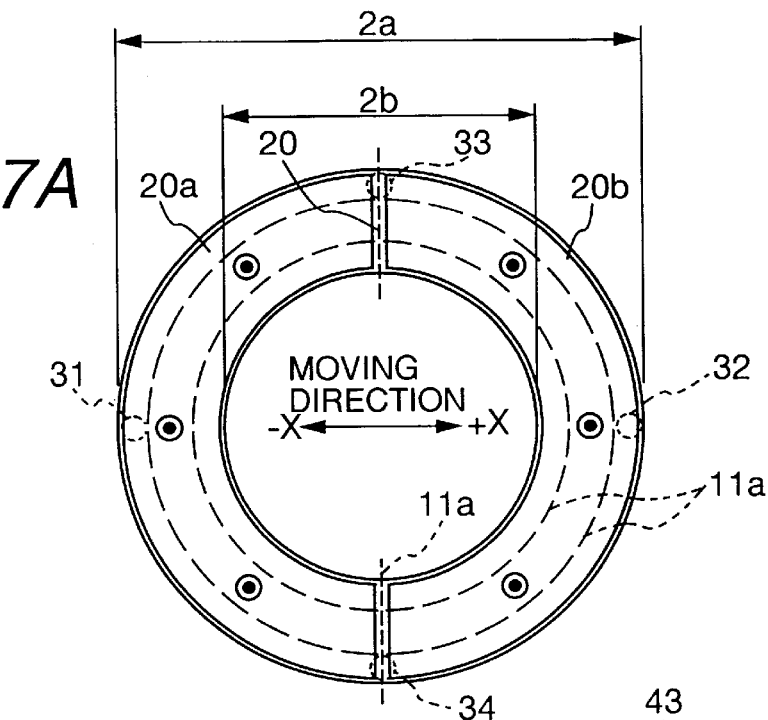
FIG. 7A is a plan view showing the overall arrangement of a second embodiment of a vibration actuator according to the present invention.

In the selection switch 45, when all the contacts are connected to the X side (a broken line state in FIG. 10A), the output from the amplifier 43X is connected to the electrode plates 23a and 23b, and the output from the amplifier 44X is connected to the electrode plates 23c and 23d. Therefore, since the left electrode plates 23a and 23b are grouped, and the right electrode plates 23c and 23d are grouped, the same state as in FIG. 7A is attained, and a movement in the X-direction is allowed.

Similarly, in the selection switch 45, when all the contacts are connected to the Y side (a solid line state in FIG. 10A), the output from the amplifier 43Y is connected to the electrode plates 23a and 23c, and the output from the amplifier 44Y is connected to the electrode plates 23b and 23d. Therefore, since the upper electrode plates 23a and 23c are grouped and the lower electrode plates 23b and 23d are grouped, a state obtained by rotating the state in FIG. 7A through 90° is attained, and a movement in the Y-direction is allowed.

In particular, in this embodiment, the shape of each of the driving force output members 31 to 34 is preferably defined by a portion of a solid bounded by a curved surface such as a sphere, ellipsoid, or the like so that uniform driving forces can be obtained in two directions, i.e., the X- and Y-directions.

In the third embodiment as well, since adhesion and alignment of the piezoelectric element are easily attained, excitation nonuniformity can be eliminated, and any right/left difference (the difference between moving speeds in +x- and -x-directions and in +y- and -y-directions) depending on the moving directions can also be eliminated as in the second embodiment.

Figure 13:
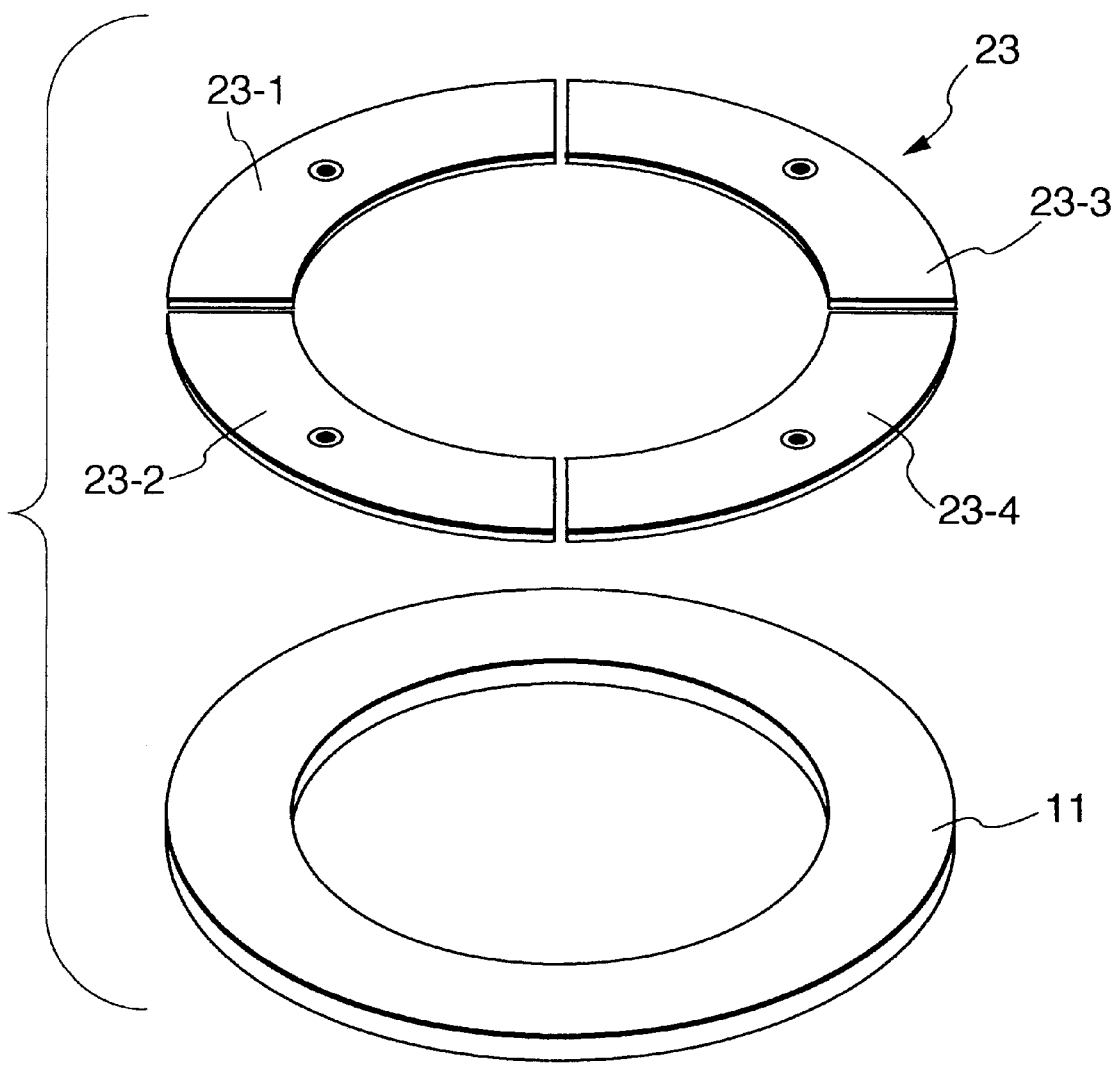
FIG. 13 is a perspective view showing a modification of the elastic member and the piezoelectric element of the third embodiment.

In a modification shown in FIG. 13, the piezoelectric element 23 is divided into four piezoelectric elements 23-1, 23-2, 23-3, and 23-4.

(Fourth Embodiment)

FIGS. 14 to 17D show the fourth embodiment of a vibration actuator according to the present invention.

In the third embodiment, the switching operation for grouping the four-divided piezoelectric element portions in the X- and Y-directions is performed. In the fourth embodiment, piezoelectric elements for the X- and Y-directions are separately arranged on the two surfaces of the elastic member 11.

Figure 15:
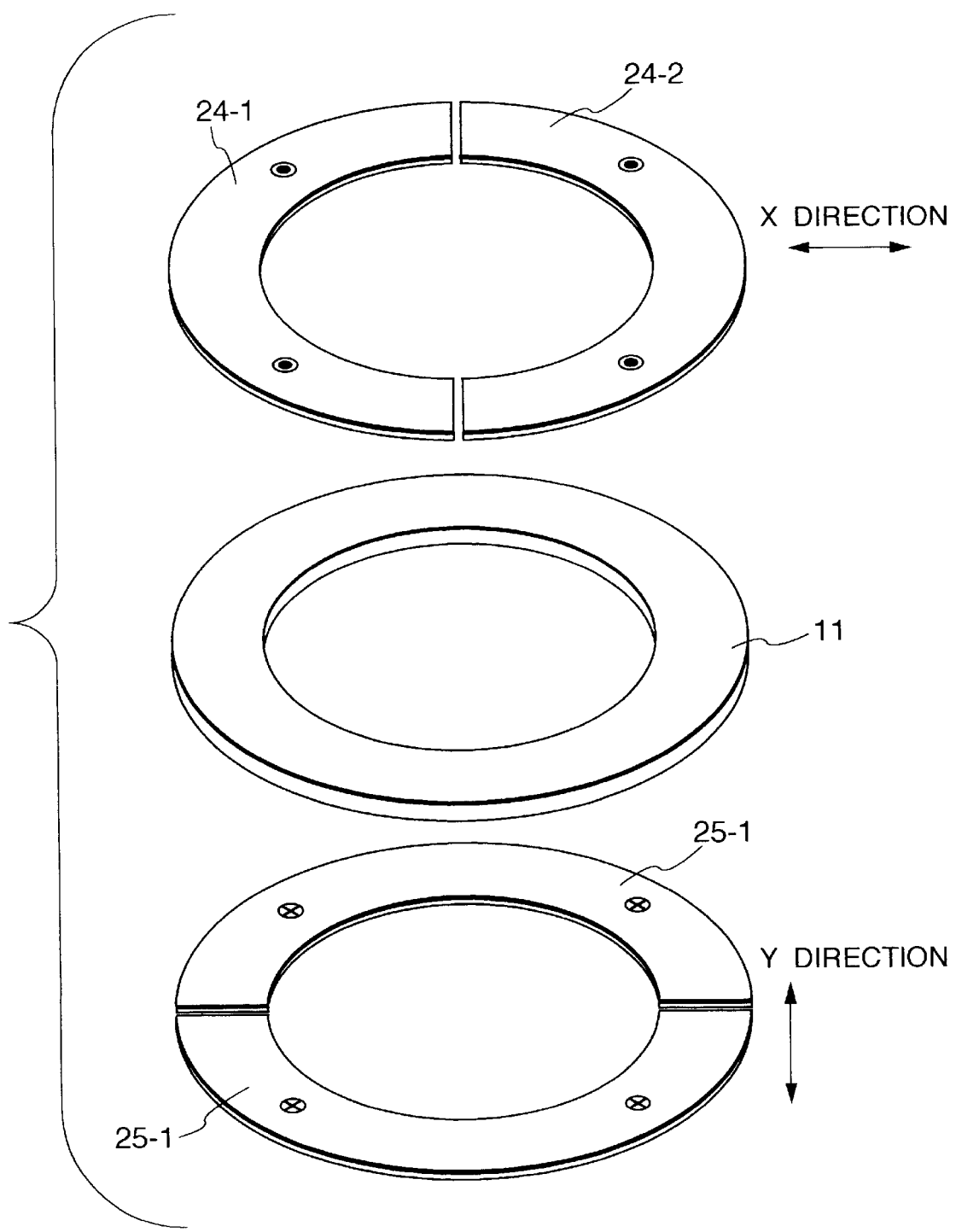
FIG. 15 is a perspective view showing an elastic member and a piezoelectric element of the fourth embodiment.

As shown in FIG. 15, piezoelectric elements 24-1 and 24-2 for the X-direction are arranged on the upper surface of the elastic member 11, and piezoelectric elements 25-1 and 25-2 for the Y-direction are arranged on the lower surface of the elastic member 11.

Figure 14:
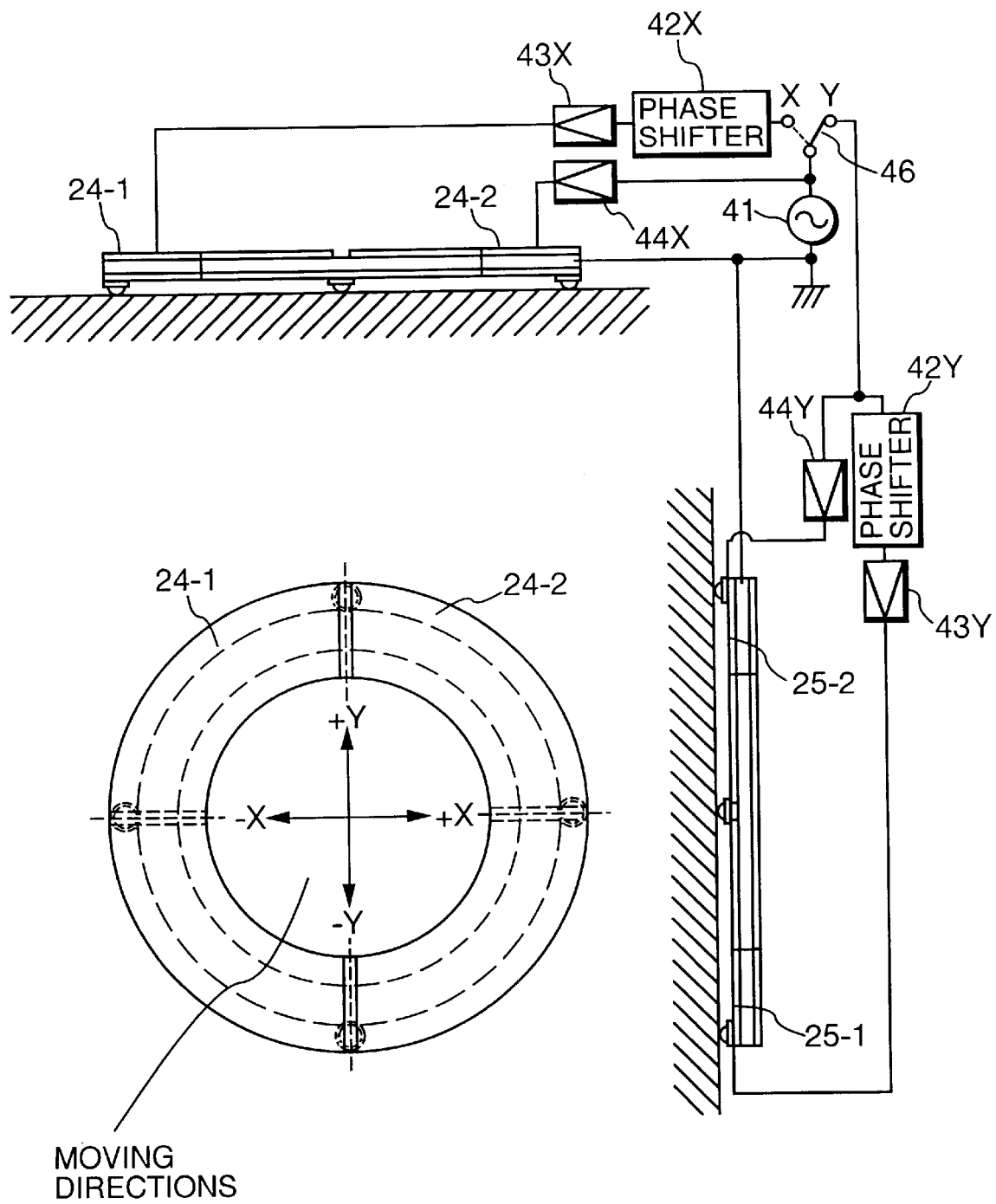
FIG. 14 is a plan view showing the overall arrangement of a fourth embodiment of a vibration actuator according to the present invention.

In a driving circuit, as shown in FIG. 14, a high-frequency signal from the oscillator 41 is connected to a driving circuit (a phase shifter 42X and amplifiers 43X and 44X) for the X-direction, and a driving circuit (a phase shifter 42Y and amplifiers 43Y and 44Y) for the Y-direction via a selection switch 46.

The amplifiers 43X, 43Y, 44X, and 44Y are respectively connected to the piezoelectric elements 24-1, 24-2, 25-1, and 25-2 via the selection switch 46.

In the selection switch 46, when the moving contact is connected to the X side (a broken line state in FIG. 14), the output from the amplifier 43X is connected to the piezoelectric element 24-1, and the output from the amplifier 44X is connected to the piezoelectric element 24-2, thus allowing a movement in the X-direction.

In the selection switch 46, when the moving contact is connected to the Y side (a solid line state in FIG. 14), the output from the amplifier 43Y is connected to the piezoelectric element 25-1, and the output from the amplifier 44Y is connected to the piezoelectric element 25-2, thus allowing a movement in the Y-direction.

Figure 16A:
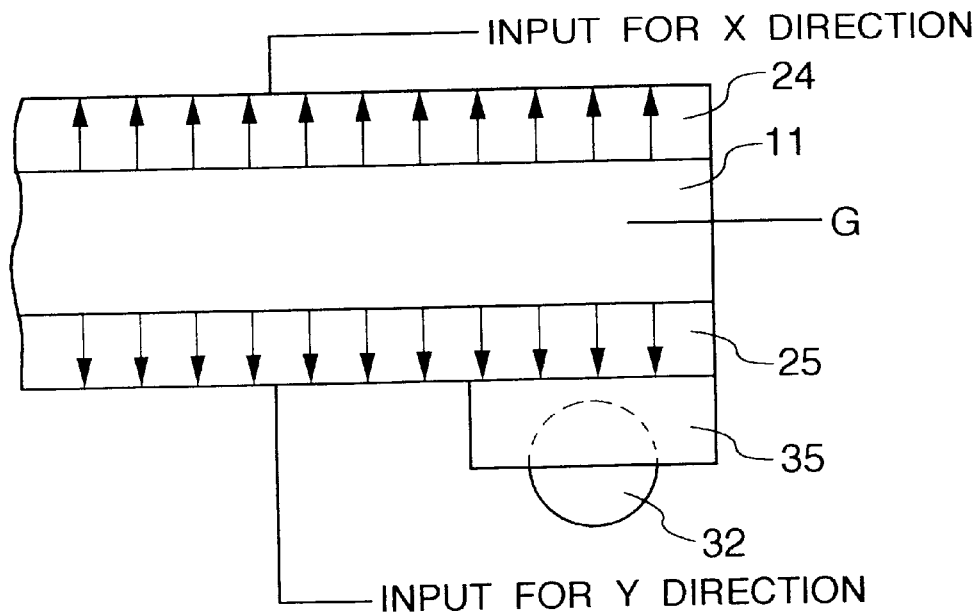
FIGS. 16A and 16B are views showing the layout of driving force output members of the fourth embodiment.
Figure 16B:
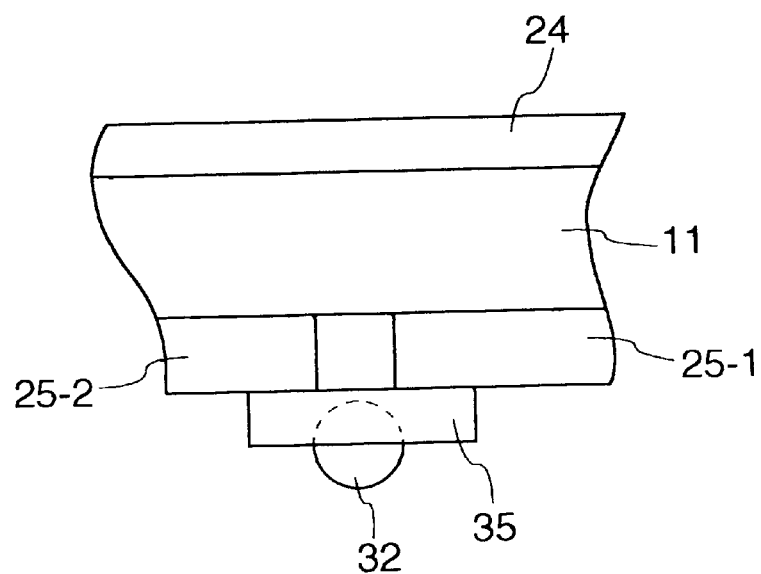

In this embodiment, since the piezoelectric elements 25 are arranged on the lower surface of the elastic member 11, the driving force output member 32 is disposed at a position extending over the two piezoelectric elements 25-1 and 25-2. For this reason, as shown in FIGS. 16A and 16B, the driving force output member 32 is attached via an attachment member 35 consisting of an insulating material such as fine ceramics.

Alternatively, as shown in FIGS. 17A and 17B, the radius of each of the piezoelectric elements 24 and 25 may be decreased by the width of each attachment member 35, or as shown in FIG. 17C, the interval between the piezoelectric elements 25-1 and 25-2 may be set to be larger than the size of the driving force output member 32, and the member 32 may be directly attached to the elastic member 11. Furthermore, as shown in FIG. 17D, attachment members 36 may extend outwardly from the elastic member 11, and the driving force output members 31 to 34 may be attached to these attachment members 36.

Since the fourth embodiment uses a plurality of piezoelectric elements, if elements having equal polarization (poling) states are selected, a piezoelectric element group suffering less nonuniformity in units of sectors as a whole can be obtained. Note that the same applies to the piezoelectric elements shown in FIG. 6 in the first embodiment or shown in FIG. 13 in the third embodiment.

(Fifth Embodiment)

Figure 18:
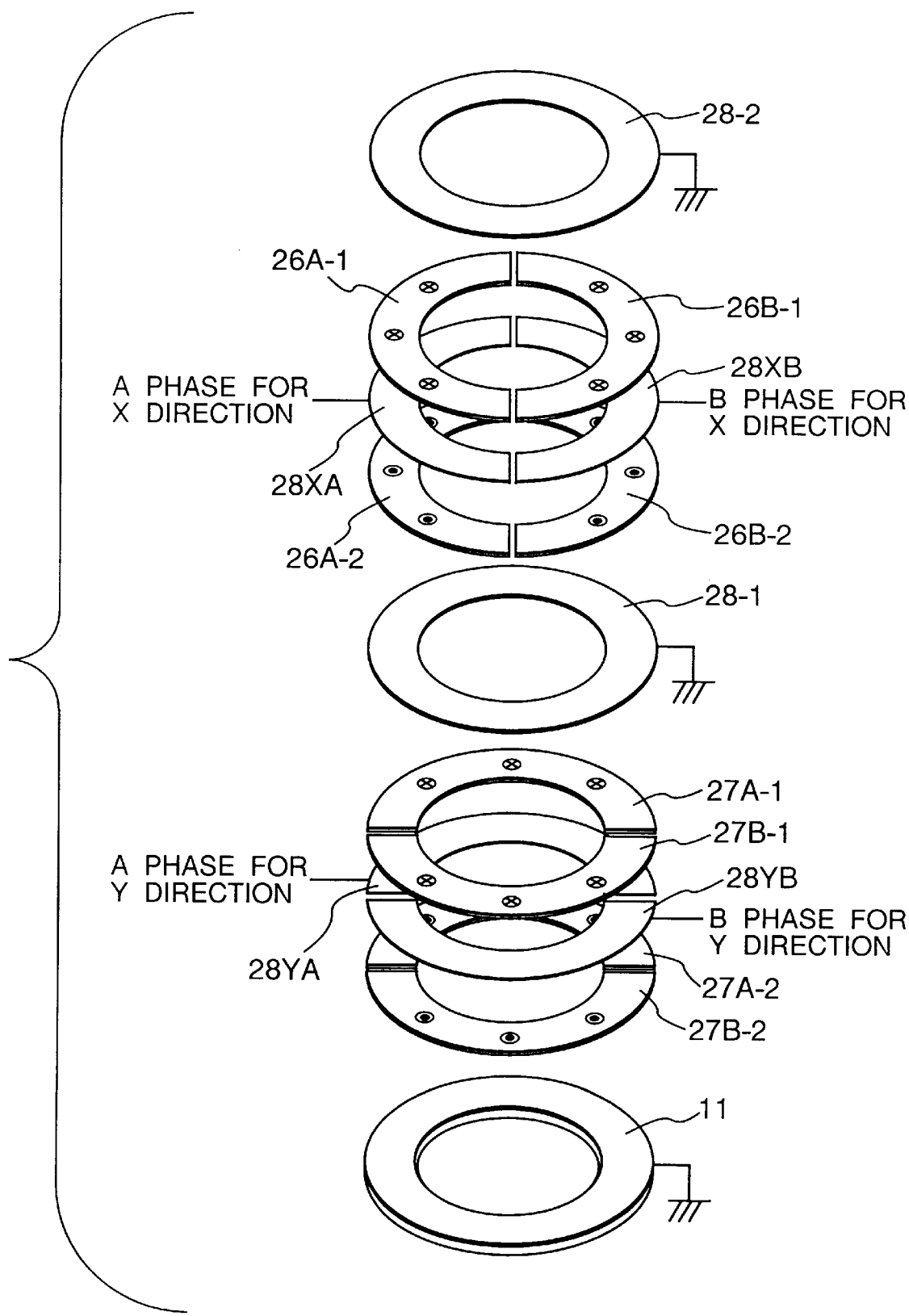
FIG. 18 is a view showing the layout of piezoelectric elements of a fifth embodiment of a vibration actuator according to the present invention.
Figure 19:
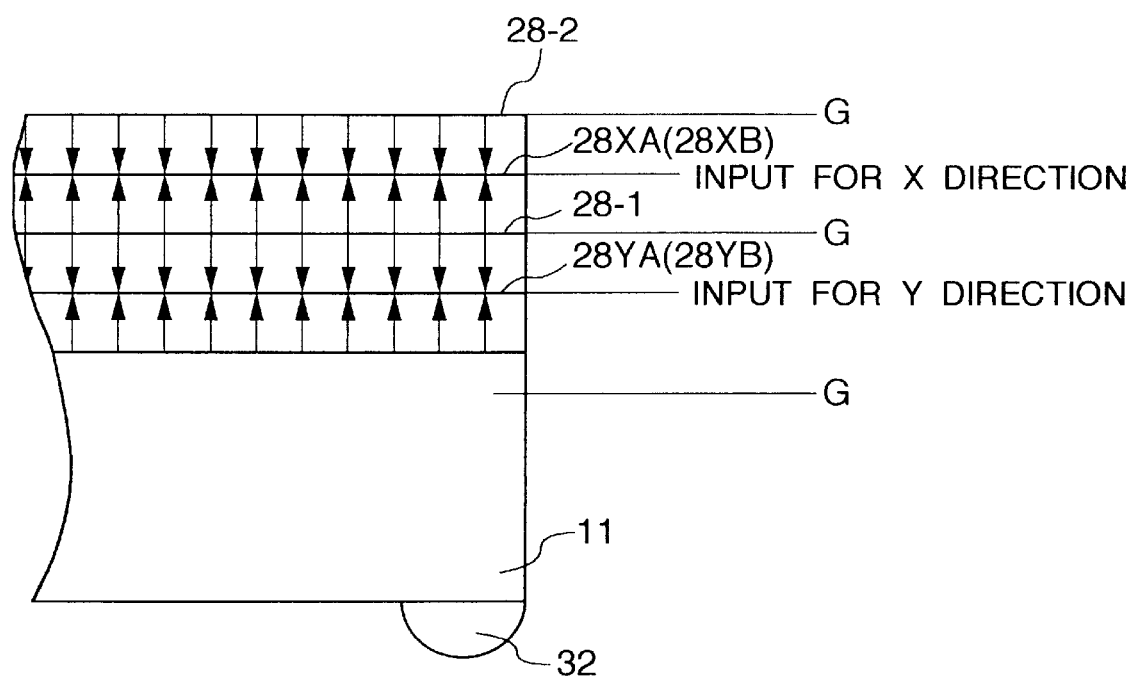
FIG. 19 is a partial enlarged view of FIG. 18.

FIGS. 18 and 19 show the fifth embodiment of a vibration actuator according to the present invention.

In the fourth embodiment, the piezoelectric elements for the X- and Y-directions are independently arranged on the two surfaces of the elastic member 11. However, in the fifth embodiment, piezoelectric elements for the X- and Y-directions are stacked on the upper surface of the elastic member 11.

A piezoelectric element 27 for the Y-direction is joined to the upper surface of the elastic member 11, and is constituted by stacking piezoelectric materials 27A-1 and 27B-1, and 27A-2 and 27B-2 while sandwiching electrode plates 28YA and 28YB (e.g., copper plates) therebetween.

On the other hand, a piezoelectric element 26 for the X-direction is joined to the piezoelectric element 27 for the Y-direction via an electrode plate 28-1, and is constituted by stacking piezoelectric materials 26A-1 and 26B-1, and 26A-2 and 26B-2 while sandwiching electrode plates 28XA and 28XB therebetween. Furthermore, an electrode plate 28-2 is joined to the upper surface of the element 26.

The poling directions of the respective piezoelectric materials are as shown in FIG. 19. The electrode plates 28XA and 28XB, and the electrode plates 28YA and 28YB are respectively connected to inputs for the X- and Y-directions, and the electrode plates 28-1 and 28-2 and the elastic member 11 are connected to ground.

According to the fifth embodiment, since the number of piezoelectric materials increases, a large driving force can be obtained.

(Sixth Embodiment)

Figure 20A:
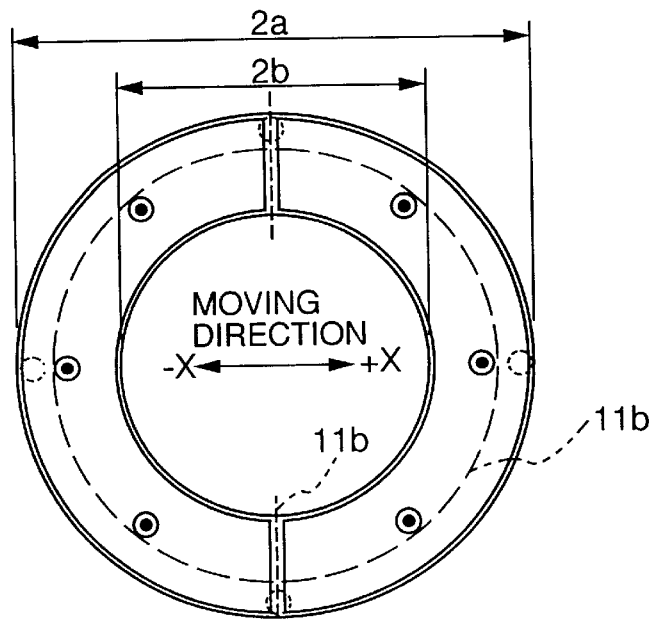
FIG. 20A is a plan view showing the overall arrangement of a sixth embodiment of a vibration actuator according to the present invention.
Figure 20B:
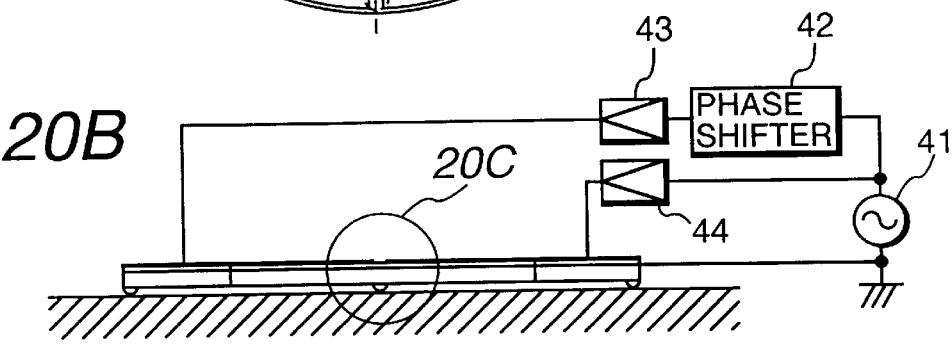
FIG. 20B is a side view showing the overall arrangement of the sixth embodiment.
Figure 20C:
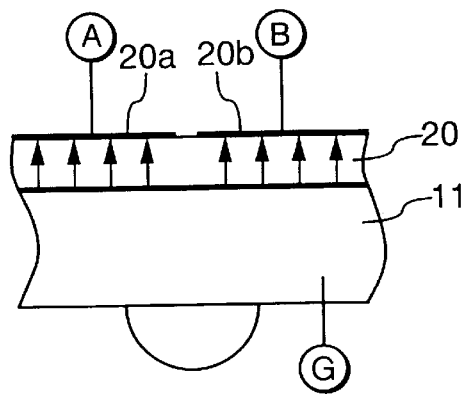
FIG. 20C is a view showing the layout of driving force output members in the sixth embodiment.

FIGS. 20A to 20C show the overall arrangement of the sixth embodiment of a vibration actuator according to the present invention.

Figure 7B:
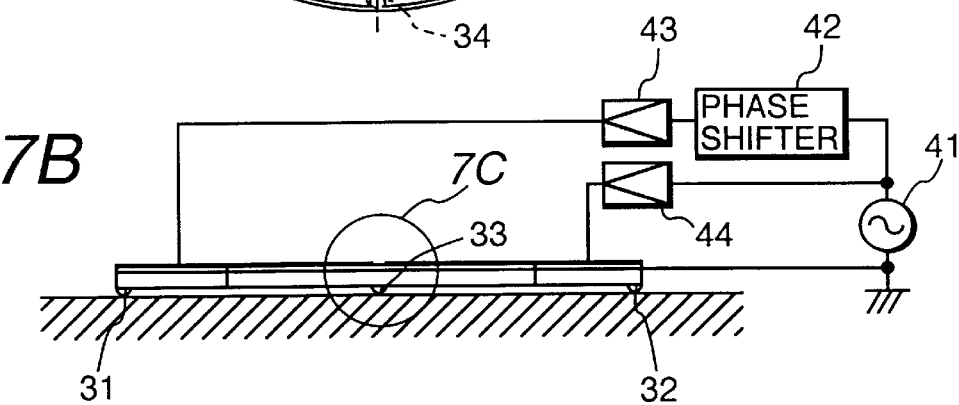
FIG. 7B is a side view showing the overall arrangement of the second embodiment.
Figure 7C:
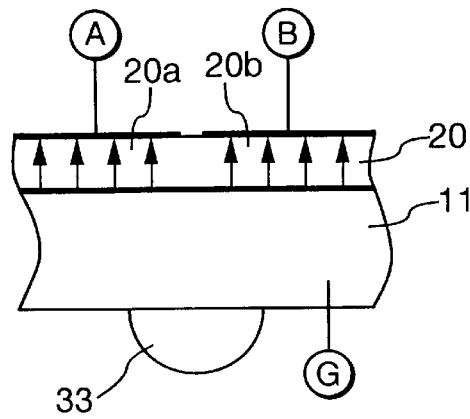
FIG. 7C is a view showing the layout of driving force output members in the second embodiment.
Figure 8:
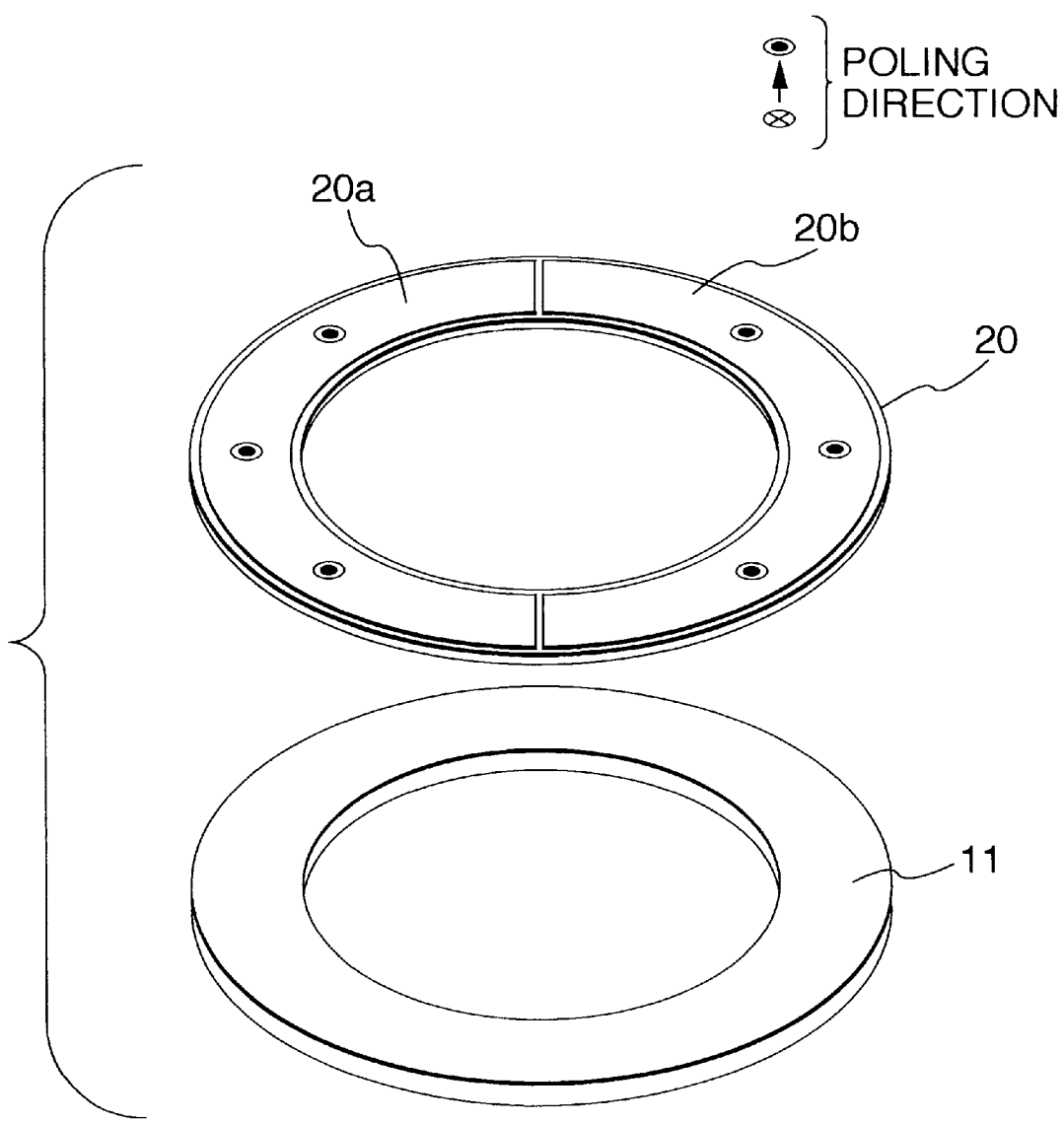
FIG. 8 is a perspective view showing an elastic member and a piezoelectric element of the second embodiment.

The sixth embodiment has substantially the same arrangement as that of the second embodiment shown in FIGS. 7A to 7C, except that this embodiment exemplifies a case of an (R-1)-$B_{11}$ mode (1st-order bending) in place of the (R-1)-$B_{21}$ mode exemplified in the second embodiment. Nodes 11b of this (R-1)-$B_{11}$ mode are shown in FIG. 20A.

(Seventh Embodiment)

Figure 21A:
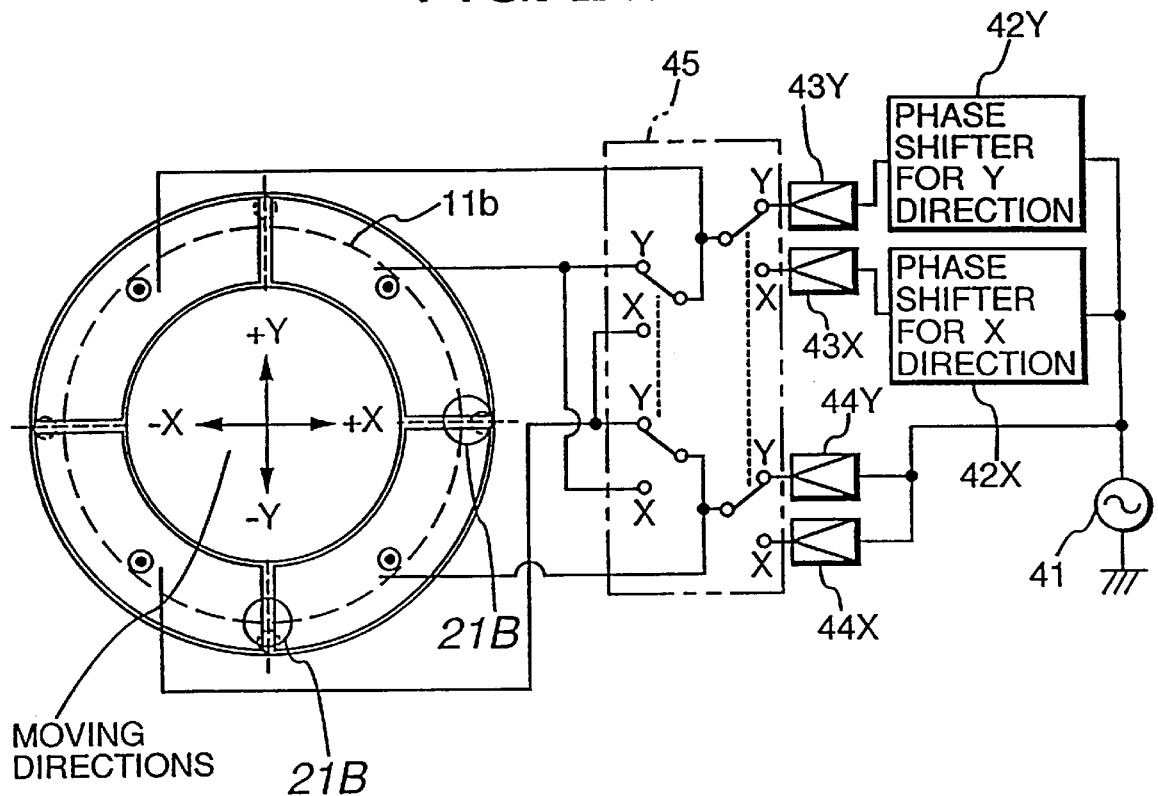
FIG. 21A is a view showing the overall arrangement of a seventh embodiment of a vibration actuator according to the present invention.
Figure 21B:
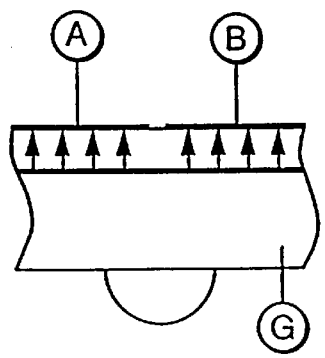
FIG. 21B is a view showing the layout of driving force output members in the seventh embodiment.

FIGS. 21A and 21B show the overall arrangement of the seventh embodiment of a vibration actuator according to the present invention.

The seventh embodiment has substantially the same arrangement as that of the third embodiment shown in FIGS. 10A and 10B, except that this embodiment exemplifies a case of an (R-1)-$B_{11x}$-$B_{11y}$ mode (1st-order bending) in place of the (R-1)-$B_{21x}$-$B_{21y}$ mode exemplified in the third embodiment. Nodes 11b at this time are shown in FIG. 21A.

In the (R-1)-$B_{11}$ mode and the (R-1)-$B_{21x}$-$B_{21y}$ mode as in the sixth and seventh embodiments, the inner diameter of the ring-shaped elastic member decreases, and its thickness increases upon degeneracy of the vibrations of the (R-1) and $B_{11}$ modes as compared to the (R-1)-$B_{21}$ mode and (R-1)-$B_{21x}$-$B_{21y}$ mode. Therefore, these embodiments are suitable for a case wherein the inner diameter is to be increased with respect to the outer diameter due to a limitation on assembling dimensions in an object to be driven, i.e., a largest possible hole diameter is to be assured.

(Eighth Embodiment)

FIGS. 22A to 25 show the eighth embodiment of a vibration actuator according to the present invention. Note that FIG. 24A shows only the left half portion of an elastic member. The right half portion is omitted, for the sake of simplicity.

A vibration actuator 60 of the eighth embodiment is constituted by an elastic member 61, two piezoelectric elements 62 and 63 as electro-mechanical converting elements, which are, for example, adhered to the upper surface of the elastic member 61, and four driving force output members 64 to 67 projecting from the lower surface of the elastic member 61.

Figure 23:
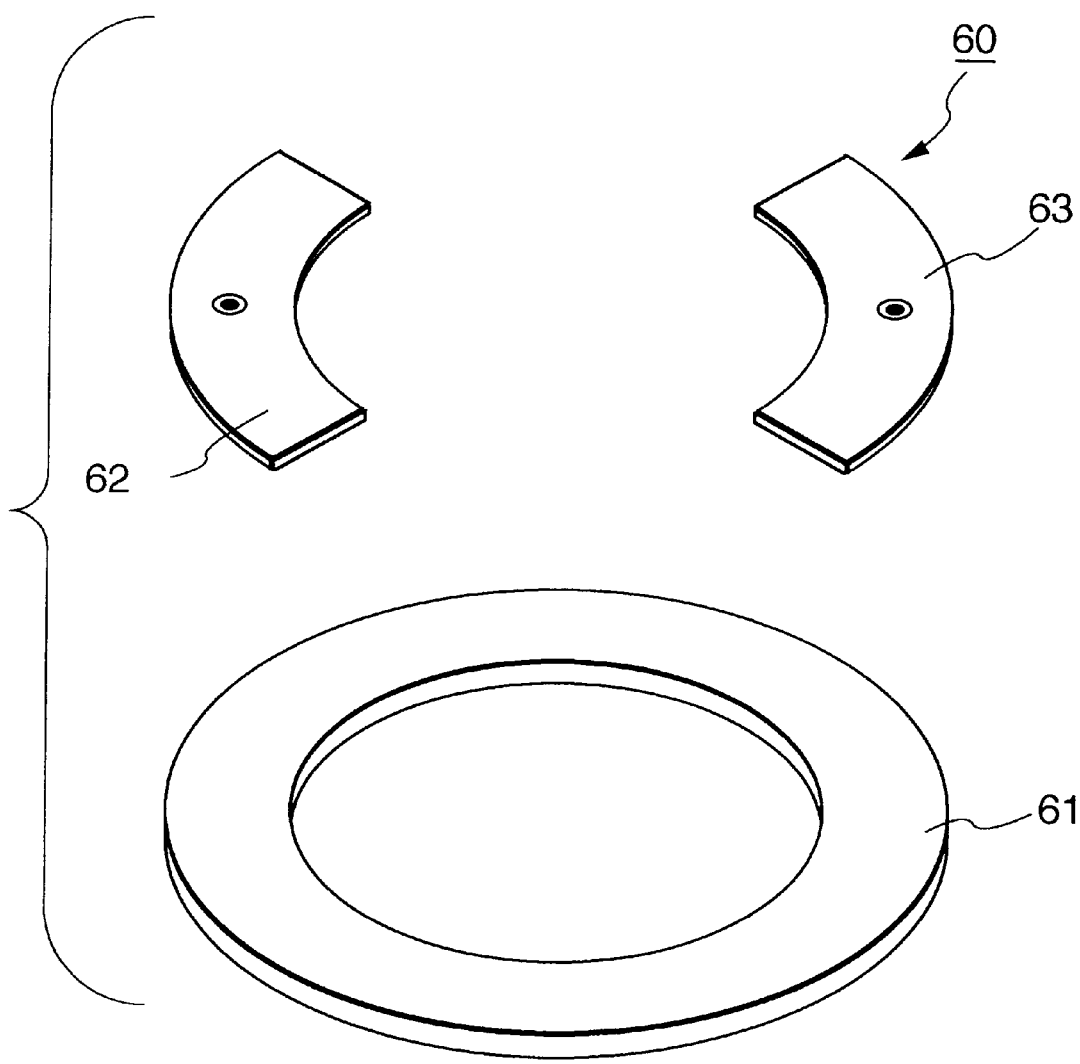
FIG. 23 is a perspective view showing an elastic member and a piezoelectric element of the eighth embodiment.

As shown in FIG. 23, the elastic member 61 is a ring-shaped elastic member, and consists of an elastic material such as a metal, plastic, or the like.

Figure 22A:
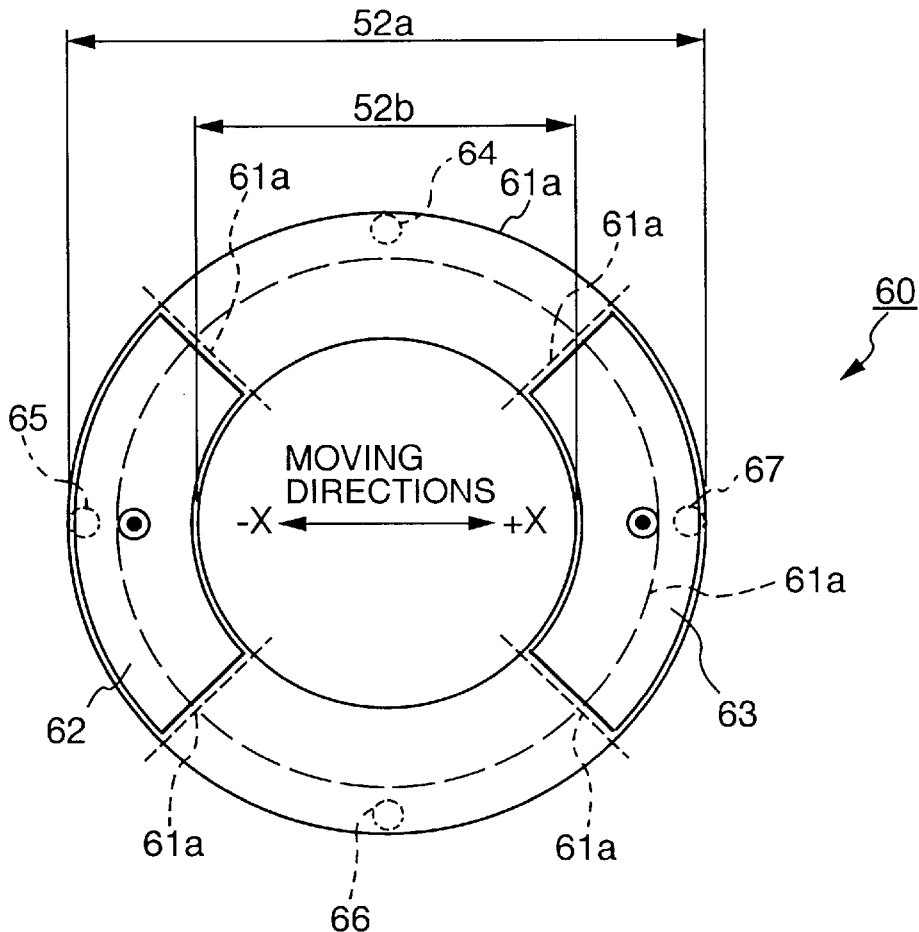
FIG. 22A is a plan view showing the overall arrangement of an eighth embodiment of a vibration actuator according to the present invention.
Figure 22B:
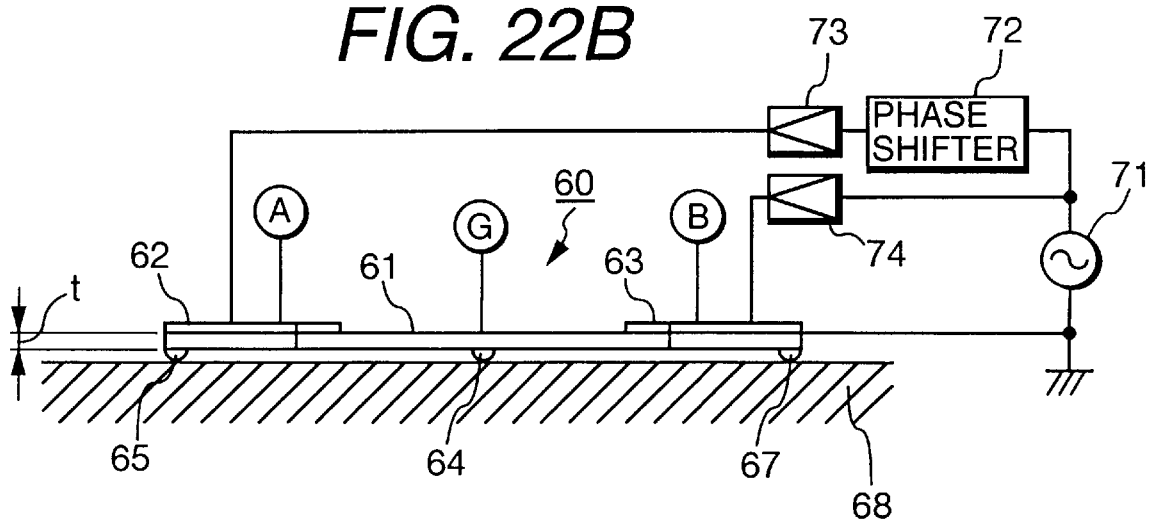
FIG. 22B is a side view showing the overall arrangement of the eighth embodiment.

When the dimensions (outer diameter: 52a, inner diameter: 52b, and thickness: t) of the ring of the elastic member 61 shown in FIGS. 22A and 22B are set to fall within the range to be described later, a non-axisymmetric vibration [((1,1))-((1,1))' mode: planar vibration] can be matched with a 2nd-order bending vibration ($B_{12}$ mode).

More specifically, according to the confirmation results of the present inventor, for example, when the driving frequency f=40 to 60 kHz, the non-axisymmetric vibration [((1,1))-((1,1))' mode: planar vibration] can be matched with the 2nd-order bending vibration ($B_{12}$ mode) within the range of the outer diameter 52a=40 to 50 mm, the thickness t=1.5 to 2.0 mm, and (inner diameter 52b)/(outer diameter 52a)= 0.4 to 0.6, thus allowing degeneracy.

This embodiment exemplifies degeneracy between the ((1,1))-((1,1))' mode and the $B_{12}$ mode, and nodes 61a of a bending vibration of the $B_{12}$ mode are indicated by broken lines in FIGS. 22A and 24A.

As shown in FIG. 23, each of the piezoelectric elements 62 and 63 has a quarter ring shape in this embodiment, and consists of, e.g., PZT. The piezoelectric elements 62 and 63 are polarized, as shown in FIG. 22A, and are respectively supplied with 2-phase input voltages A and B.

The driving force output members 64 to 67 pick up an elliptic motion generated by a synthesized vibration of the bending and extensional vibrations of the elastic member 61, and move relative to a fixed member 68 (relative moving member) while contacting it. As shown in FIG. 22A, the driving force output members 64 to 67 are arranged at 90° angular intervals on four outer edge positions of the lower surface of the elastic member 61. Spheres consisting of, e.g., silicon nitride are attached to the driving force output members 64 to 67 to improve their wear resistance.

Note that the piezoelectric elements 62 and 63 may be arranged on the same surface as the driving force output members 64 to 67. In this case (also when the driving force output members 64 to 67 have a conductivity), in order to prevent short-circuiting, the members 64 to 67 are preferably joined to the surfaces of the piezoelectric elements 62 and 63 via insulating members.

These driving force output members 64 to 67 are preferably arranged at positions other than the node positions of a bending vibration so as to efficiently pick up a driving force. Like the driving force output members 64 and 65 shown in FIG. 24B or 24C, each driving force output member is preferably arranged at an antinode position of a vertical vibration in a direction substantially perpendicular to the moving plane.

As shown in FIG. 22B, the vibration actuator 60 generates a composite vibration of the non-axisymmetric and bending vibrations by applying high-frequency voltages A and B to the two piezoelectric elements 62 and 63, thereby generating elliptic motions at the distal ends of the driving force output members 64 and 65 so as to generate a driving force. In FIG. 22B, G represents ground. The two piezoelectric elements 62 and 63 are polarized in the same direction, and the high-frequency voltages A and B have a time phase difference of $\pi/2$ therebetween. Note that the two piezoelectric elements 62 and 63 may be polarized in opposite directions.

As shown in FIG. 22B, an oscillator 71 is used for oscillating a high-frequency signal. The output from the oscillator 71 is divided into two outputs, so that one output is converted into a signal having a time phase difference of $\pi/2$ by a phase shifter 72 and is then connected to an amplifier 73, and the other output is directly connected to an amplifier 74. The outputs from the amplifiers 73 and 74 are respectively connected to the piezoelectric elements 62 and 63 as the high-frequency voltages A and B.

Figure 25:
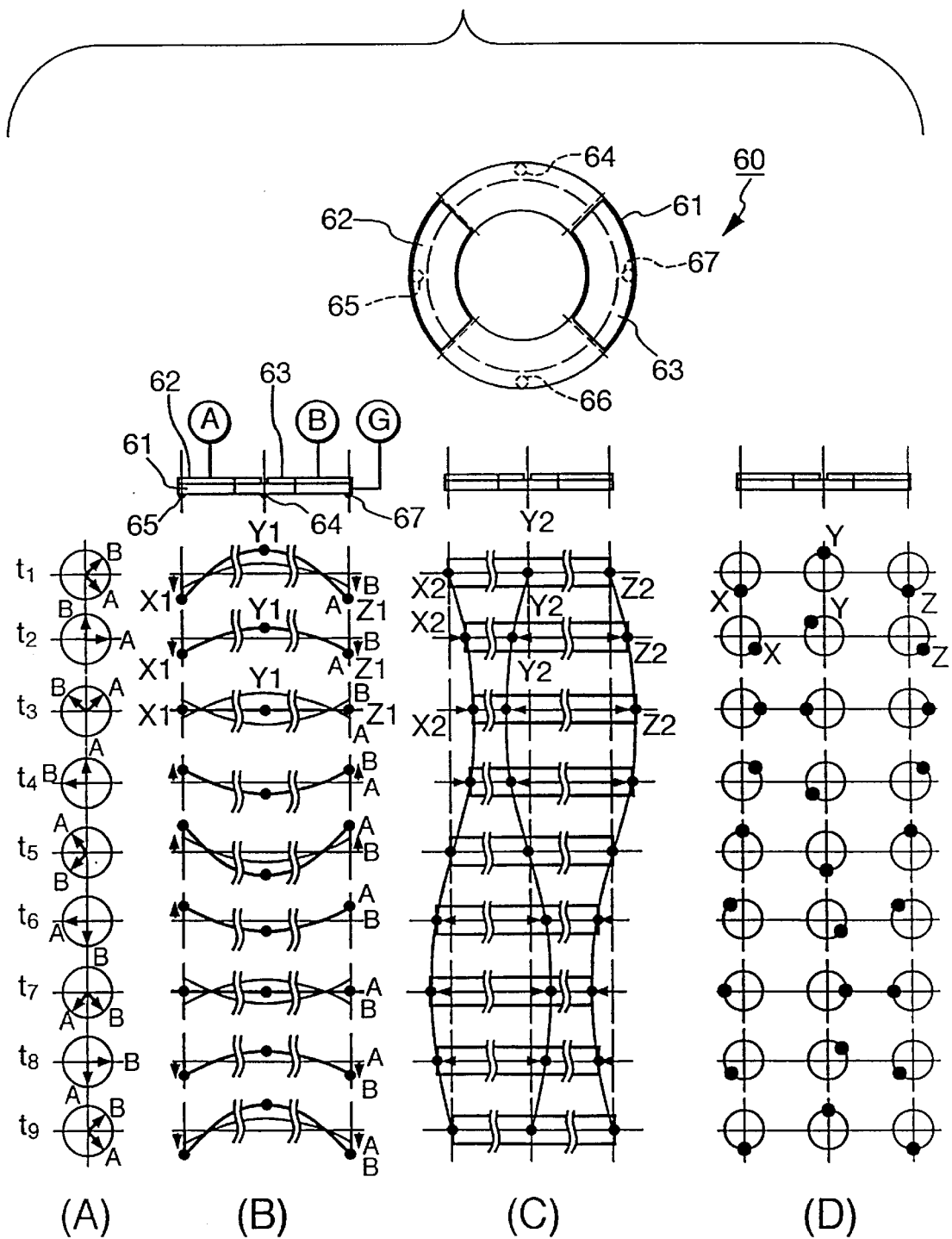
FIG. 25 is a view for explaining the operation of the eighth embodiment.
Figure 27:
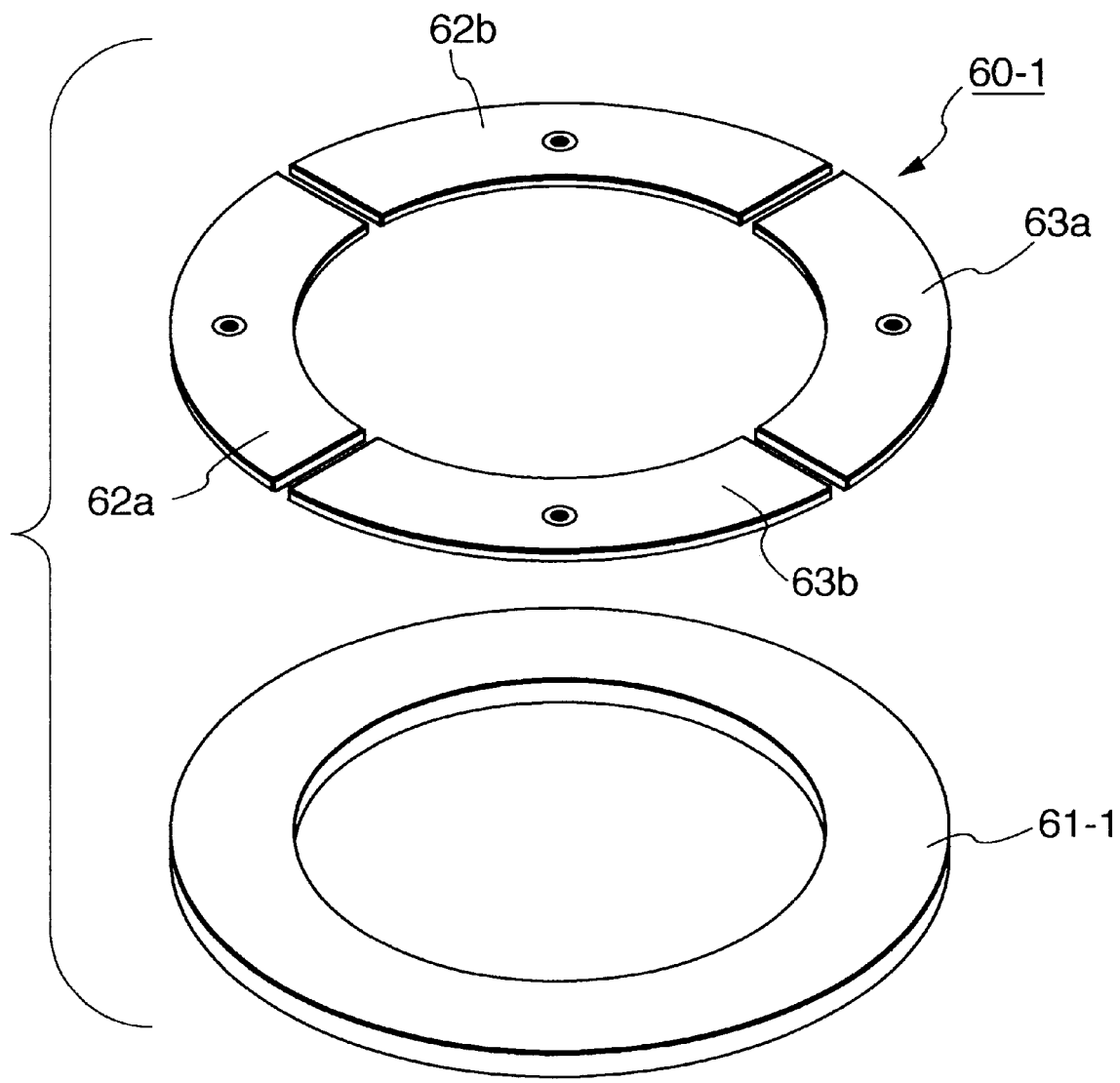
FIG. 27 is a perspective view showing an elastic member and a piezoelectric element of the ninth embodiment.

Column (A) in FIG. 25 shows changes, over time, in two-phase high-frequency voltages A and B input to the vibration actuator 60 at times $t_1$ to $t_9$. The abscissa in column (A) in FIG. 25 represents the effective value of the high-frequency voltage. Column (B) in FIG. 25 shows the deformation states of the section of the vibration actuator, i.e., shows a change, over time, in bending vibration generated in the vibration actuator at times $t_1$ to $t_9$. Column (C) in FIG. 25 shows the deformation states of the section of the vibration actuator, i.e., shows a change, over time, in non-axisymmetric vibration generated in the vibration actuator at times $t_1$ to $t_9$. Column (D) in FIG. 25 shows a change, over time, in elliptic motion at mass points X, Y, and Z of the vibration actuator at times $t_1$ to $t_9$.

The operation of the vibration actuator 60 of this embodiment will be described below with reference to FIG. 25 along the change over time ($t_1$ to $t_9$).

At time $t_1$, as shown in column (A) in FIG. 25, the high-frequency voltage A generates a positive voltage, and the high-frequency voltage B similarly generates a positive voltage having the same magnitude as that generated by the voltage A. As shown in column (B) in FIG. 25, bending vibrations by the high-frequency voltages A and B amplify one another, mass points X1 and Z1 exhibit a maximum negative amplitude value, and a mass point Y1 exhibit a maximum positive amplitude value. As shown in column (C) in FIG. 25, the amplitudes of the non-axisymmetric vibrations by the high-frequency voltages A and B are zero, and the amplitudes of mass points X2, Y2, and Z2 are zero. As a result, as shown in column (D) in FIG. 25, the two amplitudes are synthesized, i.e., the synthesis of the motions of the mass points X1 and X2 generates a motion of a mass point X, the synthesis of the motions of the mass points Y1 and Y2 generates a motion of a mass point Y, and the synthesis of the motions of the mass points Z1 and Z2 generates a motion of a mass point Z.

At time $t_2$, as shown in column (A) in FIG. 25, the high-frequency voltage B becomes zero, and the high-frequency voltage A generates a positive maximum voltage. As shown in column (B) in FIG. 25, the amplitude of the bending vibration by the high-frequency voltage A decreases, the amplitude of the bending vibration by the high-frequency voltage B becomes zero, and the displacements of the mass points X1, Y1, and Z1 respectively decrease. As shown in column (C) in FIG. 25, a non-axisymmetric motion of a certain amplitude is generated by the high-frequency voltage A, the mass points X2 and Z2 are displaced to the right in FIG. 25, and the mass point Y2 is displaced to the left in FIG. 25. As a result, as shown in column (D) in FIG. 25, the two vibrations are synthesized, and the mass points X, Y, and Z make counterclockwise elliptic motions from their positions at time $t_1$.

At time $t_3$, as shown in column (A) in FIG. 25, the high-frequency voltage A generates a positive voltage, and the high-frequency voltage B similarly generates a negative voltage having the same magnitude as that generated by the voltage A. As shown in column (B) in FIG. 25, bending vibrations by the high-frequency voltages A and B cancel each other to have an amplitude=0, and the displacements of the mass points X1, Y1, and Z1 become zero. As shown in column (C) in FIG. 25, by non-axisymmetric motions by the high-frequency voltages A and B, the mass points X2 and Z2 are further displaced to the right in FIG. 25 by a maximum amount, and the mass point Y2 is further displaced to the left in FIG. 25 by a maximum amount. As a result, as shown in column (D) in FIG. 25, the two vibrations are synthesized, and the mass points X, Y, and Z further move counterclockwise from their positions at time $t_2$.

At time $t_4$, as shown in column (A) in FIG. 25, the high-frequency voltage A becomes zero, and the high-frequency voltage B has a negative maximum value. As shown in column (B) in FIG. 25, the amplitude of a bending vibration by the high-frequency voltage B increases, and the displacements of the mass points Xl, Y1, and Z1 increase. As shown in column (C) in FIG. 25, by non-axisymmetric motions by the high-frequency voltages A and B, the displacement amounts, to the right in FIG. 25, of the mass points X2 and Z2 decrease, and the displacement amount, to the left in FIG. 25, of the mass point Y2 also decreases. As a result, as shown in column (D) in FIG. 25, the two vibrations are synthesized, and the mass points X, Y, and Z further move counterclockwise from their positions at time $t_3$.

At time $t_5$, as shown in column (A) in FIG. 25, the high-frequency voltage A generates a negative voltage, and the high-frequency voltage B similarly generates a negative voltage having the same magnitude as that generated by the voltage A. As shown in column (B) in FIG. 25, bending motions by the high-frequency voltages A and B amplify each other, and the mass points X1, Y1, and Z1 have maximum amplitudes. As shown in column (C) in FIG. 25, the amplitudes of the non-axisymmetric motions by the high-frequency voltages A and B further decrease, and the displacement amounts of the mass points X2, Y2, and Z2 become zero. As a result, as shown in column (D) in FIG. 25, the two vibrations are synthesized, and the mass points X, Y, and Z further move counterclockwise from their positions at time $t_4$.

As time elapses from $t_6$ to $t_9$, the bending and non-axisymmetric vibrations are generated in the same manner as in the above-mentioned principle. As a result, as shown in column (D) in FIG. 25, the mass points X, Y, and Z move counterclockwise, i.e., make elliptic motions.

With the above-mentioned principle, the vibration actuator generates elliptic motions shown in column (D) in FIG. 25 at the distal ends of the driving force output members 64 to 67, thereby generating a driving force. Therefore, when the distal ends of the driving force output members 64 to 67 are brought into press contact with the fixed member 68 as the relative moving member, the elastic member 61 moves by itself relative to the fixed member 68.

More specifically, as shown in column (D) in FIG. 25, at times t1 to $t_3$, since the mass points 65 and 67 contact the fixed member while generating counterclockwise elliptic motions, the elastic member 61 moves to the left in FIG. 25.

At times $t_3$ to $t_7$, since the mass points 65 and 67 contact the fixed member while generating counterclockwise elliptic motions, the elastic member 61 moves to the left in FIG. 25.

Furthermore, at times $t_7$ to $t_9$, since the mass points 65 and 67 contact the fixed member while generating counterclockwise elliptic motions, the elastic member 61 moves to the left in FIG. 25.

Thereafter, the above-mentioned operations are repeated, and the elastic member 61 moves to the left in FIG. 25.

In this manner, the vibration actuator 60 which can one-dimensionally move in a plane, and can be easily assembled in a cylindrical portion such as a lens barrel can be provided.

In particular, since the elastic member 61 used in the vibration actuator 60 according to the present invention has a ring shape, the vibration actuator can be applied to, e.g., a lens barrel of a camera, and can be used as a driving source for a blur prevention device.

(Ninth Embodiment)

FIGS. 26A to 28 show the ninth embodiment of a vibration actuator according to the present invention.

Note that the same reference numerals in this embodiment denote the same parts as in the eighth embodiment, and a detailed description thereof will be omitted.

The eighth embodiment provides a structure that allows only a one-dimensional movement (±x-directions). However, this embodiment allows independent two-dimensional movements (±x-directions and ±y-directions).

A vibration actuator 60-1 of this embodiment comprises a ring-shaped elastic member 61-1, four quarter ring-shaped piezoelectric elements 62a, 63a, 62b, and 63b which are arranged at equal angular intervals on the upper surface of the elastic member 61-1, and four driving force pickup portions 64 to 67 which are arranged at equal angular intervals on the upper surface of the elastic member 61-1.

In this embodiment, all the piezoelectric elements 62a, 63a, 62b, and 63b are adhered on a single surface. Alternatively, the piezoelectric elements 62a and 63a, and the piezoelectric elements 62b and 63b may be respectively adhered on the two surfaces of the elastic member.

Figure 28:
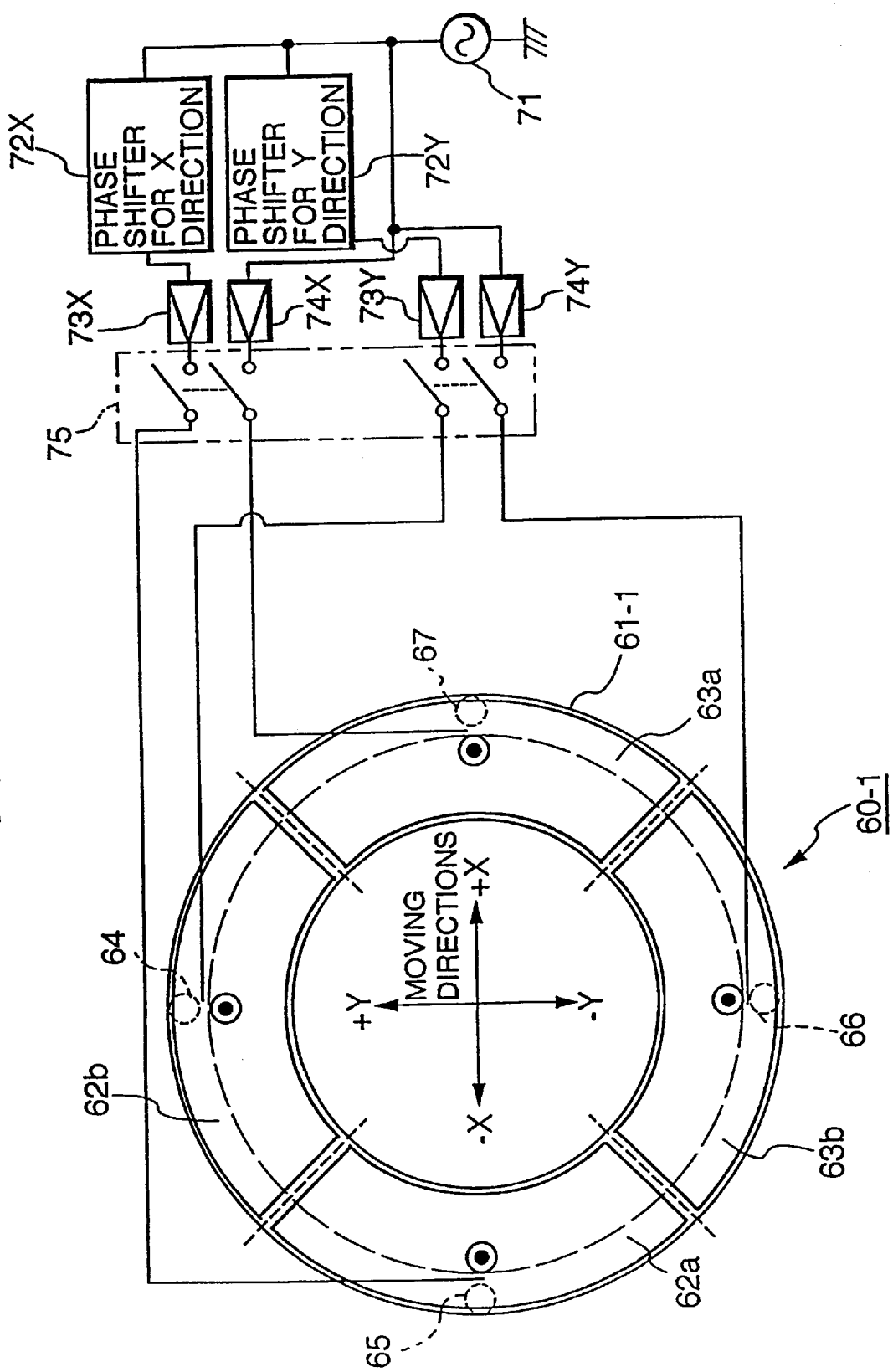
FIG. 28 is a plan view of the vibration actuator together with a control circuit of the ninth embodiment.

In a driving circuit, as shown in FIG. 28, a high-frequency signal from an oscillator 71 is divided into two outputs. One output is temporally phase-shifted by π/2 by phase shifters 72X and 72Y for the X- and Y-directions, and the outputs from the phase shifters are connected to amplifiers 73X and 73Y for the X- and Y-directions. On the other hand, the other output is directly connected to amplifiers 74X and 74Y for the X- and Y-directions.

The amplifiers 73X, 73Y, 74X, and 74Y are respectively connected to the piezoelectric elements 62a, 62b, 63a, and 63b via a selection switch 75.

In the selection switch 75, when all the contacts are connected to the X side, the output from the amplifier 73X is connected to the piezoelectric element 62a, and the output from the amplifier 74X is connected to the piezoelectric element 63a. Therefore, since the piezoelectric elements 62a and 63a which oppose in the X-direction are grouped, the same state as in FIG. 22A is attained, and the vibration actuator 60-1 can move in the ±X-directions.

Similarly, in the selection switch 75, when all the contacts are connected to the Y side, the output from the amplifier 73Y is connected to the piezoelectric element 62b, and the output from the amplifier 74Y is connected to the piezoelectric element 63b. Therefore, since the piezoelectric elements 62b and 63b which oppose in the Y-direction are grouped, a state obtained by rotating the state in FIG. 22A through 90° is attained, and the vibration actuator 60-1 can move in the ±Y-directions.

In particular, in this embodiment, the shape of each of the driving force output members 64 to 67 is preferably defined by a portion of a solid bounded by a curved surface such as a sphere, ellipsoid, or the like, so that uniform driving forces can be obtained in two directions, i.e., the X- and Y-directions.

(Tenth Embodiment)

In this embodiment, a ring-shaped piezoelectric element is adhered to an elastic member, and four electrodes are further adhered to the piezoelectric element at equal angular intervals in place of adhering the four quarter ring-shaped piezoelectric elements 62a, 63a, 62b, and 63b to the elastic member 61-1 like in the ninth embodiment.

Figure 29:
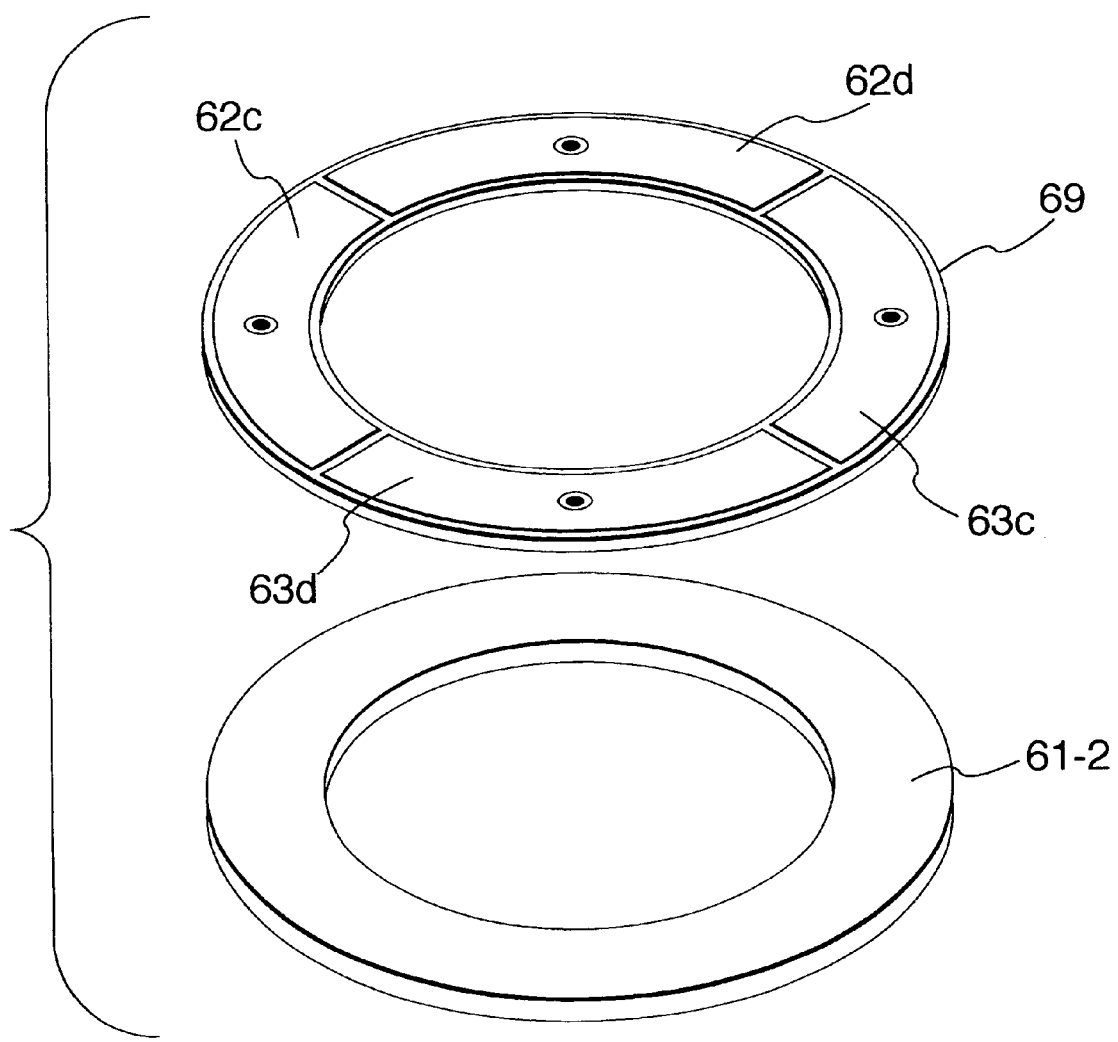
FIG. 29 is a perspective view showing an elastic member and a piezoelectric element of a tenth embodiment of a vibration actuator according to the present invention.

FIG. 29 shows an elastic member and a piezoelectric element in this embodiment. As shown in FIG. 29, a ring-shaped piezoelectric element 69 is adhered on the upper surface of a ring-shaped elastic member 61-2, and a silver electrode is printed on almost the entire region of the upper surface of the piezoelectric element 69. Portions of the silver electrode are cut away to form quarter-circular electrodes 62c, 63c, 62d, and 63d. Note that in place of cutting away unnecessary portions of the printed silver electrode, unnecessary portions may be masked in advance, and a silver electrode may be formed using a thin-film formation technique such as deposition to obtain four electrodes.

In this embodiment, since adhesion and alignment of the piezoelectric element 69 with respect to the elastic member 61-2 are facilitated, excitation nonuniformity can be eliminated, and any right/left difference (the difference between moving speeds in +x- and -x-directions and in +y- and -y-directions) depending on the moving directions can also be eliminated.

The present invention is not limited to the above-mentioned embodiments, and various changes and modifications may be made within the scope of the invention.

For example, in the above description, the electro-mechanical converting element comprises a piezoelectric element. However, the electro-mechanical converting element may comprise an electrostrictive element, magnetostrictive element, or the like.

Each of the above embodiments may be suitably applied to an X-Y stage for a microscope, a feeder of plotter sheets, and the like in addition to driving a blur correction lens in two directions.

What is claimed is:

1. A vibration actuator comprising:

an elastic member formed into a ring shape;

a driving circuit which generates two driving signals whose phases differ from one another, and a relative moving member which is in press contact with said elastic member; and means, including an electro-mechanical converting element joined to said elastic member in a reference plane where the ring shape is formed, and to which said two driving signals are applied, which generates in said elastic member a first standing-wave that vibrates in a first direction parallel to the reference plane, and a second standing-wave that vibrates in a second direction which is skewed relative to said first direction, and which generates a third standing-wave by combining the first and second standing-waves to move said relative moving member relative to said elastic member in one axial direction or two axial directions which differ from each other in the reference plane.

2. A vibration actuator according to claim 1, wherein a ratio between outer and inner diameters of said elastic member is set, so that a resonance frequency of the first standing-wave substantially matches a resonance frequency of the second standing-wave.

3. A vibration actuator according to claim 1, wherein said elastic member generates an elliptic motion by the first and second standing-waves.

4. A vibration actuator according to claim 3, wherein said elastic member comprises a driving force output member arranged at a generation position of the elliptic motion.

5. A vibration actuator according to claim 4, wherein said driving force output member contacts said relative moving member, and a contact portion of said driving force output member is formed into a curved surface shape.

6. A vibration actuator according to claim 5, wherein said driving force output member is joined to a surface of said electro-mechanical converting element via an insulating member.

7. A vibration actuator according to claim 1, wherein said second standing-wave vibrates in a direction substantially perpendicular to the reference plane.

8. A vibration actuator according to claim 2, wherein said first standing-wave is of a non-axisymmetric vibration which is an in-plane bending vibration by which said elastic member is deformed flexibly at said reference plane in a direction in said reference plane, and said second standing-wave is of an out-of-plane bending vibration by which said elastic member is deformed flexibly at said reference plane in a direction out of said reference plane.

9. A vibration actuator according to claim 8, wherein an outer diameter, an inner diameter, and a thickness of the ring shape of said elastic member are set, so that a resonance frequency of the non-axisymmetric vibration substantially matches a resonance frequency of the bending vibration.

10. A vibration actuator according to claim 8, wherein the non-axisymmetric vibration is a first-order non-axisymmetric vibration mode whose degree of marginal order is 1.

11. A vibration actuator according to claim 10, wherein the bending vibration generates one or two nodal circles in the elastic member.

12. A vibration actuator according to claim 10, wherein the bending vibration is a $B_{12}$ mode that generates one nodal circle and one or two nodal diameters in said elastic member.

13. A vibration actuator according to claim 2, wherein a plurality of electro-mechanical converting elements each identical to said electro-mechanical converting element are arranged on one surface of said elastic member, and are used as groups in correspondence with driving directions in which the relative motion is performed.

14. A vibration actuator according to claim 2, wherein said elastic member makes a motion relative to said relative moving member in two-dimensional directions in the reference plane, and said electro-mechanical converting element is divided into elements for first and second directions in the reference plane, and the divided elements are independently arranged on two surfaces of said elastic member.

15. A vibration actuator according to claim 2, wherein said elastic member makes a motion relative to said relative moving member in two-dimensional directions in the reference plane, and said electro-mechanical converting element is divided into elements for first and second directions in the reference plane, and the divided elements are stacked on one surface of said elastic member.

16. A vibration actuator according to claim 2, wherein the first standing-wave is of an extensional vibration, and the second standing-wave is of a bending vibration.

17. A vibration actuator according to claim 16, wherein the bending vibration generates one or two nodal circles in the elastic member.

18. A vibration actuator according to claim 9, wherein a ratio of the inner diameter to the outer diameter falls within a range from 0.4 to 0.6.

19. A vibration actuator according to claim 17, wherein the bending vibration is $B_{21}$ mode that generates one or two nodal circles and one nodal diameter in said elastic member.

20. A vibration actuator comprising:

an elastic member formed into a ring shape;

an electro-mechanical converting element joined to said elastic member in a reference plane where the ring shape is formed; and a relative moving member which is in press contact with said elastic member, wherein said electro-mechanical converting element generates, upon application of two driving signals whose phases differ from each other, a first standing-wave vibration that vibrates in a first direction parallel to the reference plane, and a second standing-wave vibration that vibrates in a second direction which is skewed relative to said first direction, and said relative moving member moves relative to said elastic member in one axial direction or two or more axial directions which differ from one another in the reference plane, by a third standing-wave vibration generated by combining the first and second standing-wave vibrations, wherein a ratio between outer and inner diameters of said elastic member is set, so that a resonance frequency of the first standing-wave vibration substantially matches a resonance frequency of the second standing-wave vibration, and wherein the first standing-wave vibration is an extensional vibration, and the second standing-wave vibration is a bending vibration.

21. A vibration actuator comprising:

an elastic member formed into a ring shape;

an electro-mechanical converting element joined to said elastic member in a reference plane where the ring shape is formed; and a relative moving member which is in press contact with said elastic member, wherein said electro-mechanical converting element generates, upon application of two driving signals whose phases differ from each other, a first standing-wave vibration that vibrates in a first direction parallel to the reference plane, and a second standing-wave vibration that vibrates in a second direction which is skewed relative to said first direction, and said relative moving member moves relative to said elastic member in one axial direction or two or more axial directions which differ from one another in the reference plane, by a third standing-wave vibration generated by combining the first and second standing-wave vibrations, wherein a ratio between outer and inner diameters of said elastic member is set, so that a resonance frequency of the first standing-wave vibration substantially matches a resonance frequency of the second standing-wave vibration, wherein the first standing-wave vibration in a non-axisymmetric vibration, and the second standing-wave vibration is a bending vibration, wherein an outer diameter, an inner diameter, and a thickness of the ring shape of said elastic member are set, so that a resonance frequency of the non-axisymmetric vibration substantially matches a resonance frequency of the bending vibration, and wherein a ratio of the inner diameter to the outer diameter falls within a range from 0.4 to 0.6.

22. A vibration actuator according to claim 20, wherein the bending vibration generates one or two nodal circles in the elastic member.

23. A vibration actuator according to claim 22, wherein the bending vibration is $B_{21}$ mode that generates one or two nodal circles and one nodal diameter in said elastic member.

* * * * *